United States Patent
Wang et al.

(10) Patent No.: US 10,856,221 B2
(45) Date of Patent: Dec. 1, 2020

(54) SYSTEM ENHANCEMENTS FOR USING POWER SAVING

(71) Applicant: INTERDIGITAL PATENT HOLDINGS, INC., Wilmington, DE (US)

(72) Inventors: Guanzhou Wang, Brossard (CA); Saad Ahmad, Montreal (CA); Behrouz Aghili, Commack, NY (US); Martino M. Freda, Laval (CA); Mahmoud Watfa, Saint Leonard (CA); Ulises Olvera-Hernandez, London (GB); Pascal M. Adjakple, Great Neck, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/148,769

(22) Filed: Oct. 1, 2018

(65) Prior Publication Data
US 2019/0037488 A1 Jan. 31, 2019

Related U.S. Application Data

(63) Continuation of application No. 15/088,895, filed on Apr. 1, 2016, now Pat. No. 10,091,723.
(Continued)

(51) Int. Cl.
*H04J 1/16* (2006.01)
*H04L 5/14* (2006.01)
(Continued)

(52) U.S. Cl.
CPC ....... *H04W 52/02* (2013.01); *H04W 52/0216* (2013.01); *H04W 68/02* (2013.01);
(Continued)

(58) Field of Classification Search
CPC . H04W 52/02; H04W 52/0216; H04W 76/28; H04W 68/02; H04W 72/0406; H04W 72/0473
See application file for complete search history.

(56) References Cited

U.S. PATENT DOCUMENTS 8,654,694 B2   2/2014  Chang et al.
9,001,721 B2   4/2015  Gong et al.
(Continued)

FOREIGN PATENT DOCUMENTS

| CN | 103108384 A | 5/2013 |
| TW | 200537855 A | 11/2005 |
| WO | 2015/005853 | 1/2015 |

OTHER PUBLICATIONS

The specification of U.S. Appl. No. 62/102,773 dated Jan. 13, 2015 (Year: 2015).*

(Continued)

Primary Examiner — Maharishi V Khirodhar
(74) Attorney, Agent, or Firm — Volpe Koenig

(57) ABSTRACT

A wireless transmit/receive unit (WTRU) is configured to receive at least three sets of parameters associated with power saving. A first set of the parameters is associated with an idle state. A second set of the parameters is associated with a connected state. A third set of the parameters is associated with not being in a connected state and remains registered with a network and maintains a packet data network (PDN) connection. The WTRU is configured to enter active times based on the third set of parameters on a condition that the WTRU is not in the connected state and remains registered with the network. During the active times, the WTRU is configured to monitor physical downlink control channels (PDCCHs) for paging messages.

10 Claims, 16 Drawing Sheets

Related U.S. Application Data

(60) Provisional application No. 62/201,900, filed on Aug. 6, 2015, provisional application No. 62/161,550, filed on May 14, 2015, provisional application No. 62/142,764, filed on Apr. 3, 2015.

(51) Int. Cl.

| | | |
|---|---|---|
| *H04L 12/16* | (2006.01) | |
| *H04W 52/02* | (2009.01) | |
| *H04W 76/28* | (2018.01) | |
| *H04W 68/02* | (2009.01) | |
| *H04W 72/04* | (2009.01) | |
| *H04W 60/04* | (2009.01) | |
| *H04W 48/12* | (2009.01) | |

(52) U.S. Cl.
CPC ... *H04W 72/0406* (2013.01); *H04W 72/0473* (2013.01); *H04W 76/28* (2018.02); *H04W 48/12* (2013.01); *H04W 60/04* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/23* (2018.01); *Y02D 70/24* (2018.01)

(56) References Cited

U.S. PATENT DOCUMENTS

| | | | |
|---|---|---|---|
| 9,615,327 B2 | 4/2017 | Xie et al. | |
| 10,091,723 B2* | 10/2018 | Wang | H04W 52/02 |
| 2006/0240799 A1 | 10/2006 | Kim et al. | |
| 2013/0308533 A1* | 11/2013 | Murakami | H04W 52/0216 370/328 |
| 2014/0247765 A1 | 9/2014 | Baghel et al. | |
| 2014/0286215 A1 | 9/2014 | Koc et al. | |
| 2015/0043403 A1 | 2/2015 | Martinez Tarradell et al. | |
| 2015/0098381 A1 | 4/2015 | Cucala Garcia | |
| 2015/0282083 A1 | 10/2015 | Jeong et al. | |
| 2015/0282087 A1 | 10/2015 | Yang | |
| 2015/0327215 A1 | 11/2015 | Xu | |
| 2016/0044578 A1* | 2/2016 | Vajapeyam | H04W 52/0216 370/252 |
| 2016/0073284 A1 | 3/2016 | Qian et al. | |
| 2016/0142974 A1* | 5/2016 | Lindoff | H04W 56/00 370/311 |
| 2016/0205622 A1* | 7/2016 | Ronneke | H04W 52/0203 370/311 |
| 2016/0266634 A1 | 9/2016 | Chuang | |
| 2016/0286491 A1 | 9/2016 | Haneji et al. | |
| 2016/0345262 A1* | 11/2016 | Jain | H04W 68/02 |
| 2017/0127460 A1 | 5/2017 | Chandramouli et al. | |
| 2017/0339611 A1* | 11/2017 | Landais | H04W 52/0216 |
| 2017/0339723 A1* | 11/2017 | Fujishiro | H04W 4/06 |

OTHER PUBLICATIONS

The figures of U.S. Appl. No. 62/102,773 dated Jan. 13, 2015 (Year: 2015).*

Ericsson (May 19-23, 2014, S2-141673), section 5.3.20 which states: (Year: 2014).*

Ericsson, Jan. 26-30, 2015, S2-150469 (Year: 2015).*

(3GPP TS 23.401 version 12.6.0 Release 12, dated Sep. 2014) (Year: 2014).*

3GPP TS 23.682 V12.3.0 dated Mar. 2015 (Year: 2015).*

CT4, "Reply LS on UEPCOP CT considerations," 3GPP TSG CT WG4 Meeting #62-bis, C4-131869, Porto, Portugal (Oct. 7-11, 2013).

Ericsson, "Detailing solution 1," SA WG2 Meeting S2#106, S2-143940, San Francisco (CA), USA (Nov. 17-21, 2014).

Ericsson, "Interaction between eDRX and PSM (Power Saving Mode)," SA WG2 Meeting #108, S2150809, San Jose Del Cabo, Mexico (Apr. 13-17, 2015).

Huawei, "Monte based HLcom solution," SA WG2 Meeting #107, S2-150284, Sorrento, Italy (Jan. 26-30, 2015).

Interdigital Communications, "Design Aspects of Idle Mode eDRX," 3GPP TSG-RAN WG2 #91, R2153735, Beijing, China (Aug. 24-28, 2015).

Interdigital Communications, "Handling of the System Information Update for I-eDRX UEs," 3GPP TSG-RAN WG2 #91bis, R2-154652, Malmo, Sweden (Oct. 5-9, 2015).

Qualcomm Incorporated et al., "Design considerations for extended DRX in LTE," 3GPP TSG-RAN WG2 Meeting #90bis, R2-152342, Fukuoka, Japan (May 25-29, 2015).

Qualcomm Incorporated, "Connected mode eDRX solutions," SA WG2 Meeting #108, S2-150977, Los Cabos, Mexico (Apr. 13-17, 2015).

Qualcomm Incorporated, "New WI Proposal: RAN enhancements for extended DRX in LTE," 3GPP TSG RAN Meeting #67, RP-150493, Shanghai, China (Mar. 9-12, 2015).

SA WG2, "New Work Item on Extended DRX cycle for Power Consumption Optimization," 3GPP TSG SA Meeting #68, SP-150369, Malmö, Sweden (Jun. 17-19, 2015).

Third Generation Partnership Project, "Technical Specification Group Core Network; Mobile radio interface layer 3 specification; Core Network Protocols; Stage 3 (Release 1999)," 3GPP TS 24.008 V3.20.0 (Dec. 2005).

Third Generation Partnership Project, "Technical Specification Group Core Network and Terminals; Mobile radio interface Layer 3 specification; Core network protocols; Stage 3 (Release 4)," 3GPP TS 24.008 V4.17.0 (Sep. 2007).

Third Generation Partnership Project, "Technical Specification Group Core Network and Terminals; Mobile radio interface Layer 3 specification; Core network protocols; Stage 3 (Release 5)," 3GPP TS 24.008 V5.16.0 (Jun. 2006).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.10.0 (Jun. 2011).

Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.11.0 (Jun. 2012).

Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.1.0 (Mar. 2016).

Third Generation Partnership Project, "Technical Specification Group Services and System Aspects; Architecture enhancements for service capability exposure (Release 13)," 3GPP TR 23.708 V13.0.0 (Jun. 2015).

Third Generation Partnership Project, "Technical Specification Group Services and System Aspects; Architecture Enhancements for Service Capability Exposure (Release 13)," 3GPP TR 23.708 V1.0.0 (Dec. 2014).

Third Generation Partnership Project, "Technical Specification Group Services and System Aspects; Architecture Enhancements for Service Capability Exposure (Release 13)," 3GPP TR 23.708 V1.1.0 (Feb. 2015).

Third Generation Partnership Project, "Technical Specification Group Services and System Aspects; Policy and charging control architecture (Release 7)," 3GPP TS 23.203 V7.14.1 (Jul. 2012).

Third Generation Partnership Project, "Technical Specification Group Services and System Aspects; Policy and charging control architecture (Release 8)," 3GPP TS 23.203 V8.15.0 (Dec. 2014).

Third Generation Partnership Project, "Technical Specification Group Services and System Aspects; Policy and charging control architecture (Release 9)," 3GPP TS 23.203 V9.14.0 (Dec. 2014).

Third Generation Partnership Project, "Technical Specification Group Services and System Aspects; Policy and charging control architecture (Release 10)," 3GPP TS 23.203 V10.10.0 (Dec. 2014).

(56) References Cited

OTHER PUBLICATIONS

Third Generation Partnership Project, "Technical Specification Group Services and System Aspects; Policy and charging control architecture (Release 11)," 3GPP TS 23.203 V11.15.0 (Dec. 2014).
Third Generation Partnership Project, "Technical Specification Group Services and System Aspects; Policy and charging control architecture (Release 13)," 3GPP TS 23.203 V13.3.0 (Mar. 2015).
Third Generation Partnership Project, "Technical Specification Group Services and System Aspects; Policy and charging control architecture (Release 13)," 3GPP TS 23.203 V13.7.0 (Mar. 2016).
Third Generation Partnership Project, "Technical Specification Group Services and System Aspects; Policy and charging control architecture (Release 12)," 3GPP TS 23.203 V12.11.0 (Dec. 2015).
Third Generation Partnership Project, "Technical Specification Group Services and System Aspects; Policy and charging control architecture (Release 12)," 3GPP TS 23.203 V12.8.0 (Mar. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.13.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.11.0 (Mar. 2016).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.2.0 (Mar. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.11.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.8.0 (Mar. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.6.1 (Mar. 2016).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.16.0 (Dec. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3(Release 13)," 3GPP TS 29.274 V13.5.0 (Mar. 2016).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.8.0 (Mar. 2015).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.7.0 (Dec. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13)," 3GPP TS 29.274 V13.1.0 (Mar. 2015).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.6.0 (Sep. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.14.0 (Dec. 2014).
Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.1.0 (Mar. 2015).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.12.0 (Mar. 2016).
Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 8)," 3GPP TS 23.060 V8.17.0 (Mar. 2013).
Third Generation Partnership Project, "Technical Specification Group Services and System Aspects; General Packet Radio Service (GPRS); Service description; Stage 2 (Release 9)," 3GPP TS 23.060 V9.14.0 (Mar. 2013).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V8.11.0 (Dec. 2011).
Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.11.0 (Mar. 2013).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).

(56) References Cited

OTHER PUBLICATIONS

Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).

Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.5.0 (Mar. 2016).

Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.13.0 (Dec. 2014).

Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.2.0 (Sep. 2014).

Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.8.0 (Mar. 2014).

Third Generation Partnership Project, "Technical Specification Group Radio Access Network; Evolved Universal Terrestrial Radio Access (E-UTRA); User Equipment (UE) procedures in idle mode (Release 11)," 3GPP TS 36.304 V11.6.0 (Dec. 2013).

Third Generation Partnership Project, "Technical Specification Group Core Network and Terminals; Mobile radio interface Layer 3 specification; Core network protocols; Stage 3 (Release 8)," 3GPP TS 24.008 V8.19.0 (Jun. 2013).

Third Generation Partnership Project, "Technical Specification Group Services and System Aspects; General Packet Radio Service (GPRS); Service description; Stage 2 (Release 12)," 3GPP TS 23.060 V12.11.0 (Dec. 2015).

Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.9.0 (Dec. 2015).

Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.7.0 (Dec. 2015).

Third Generation Partnership Project, "Technical Specification Group Radio Access Network; Evolved Universal Terrestrial Radio Access (E-UTRA); User Equipment (UE) procedures in idle mode (Release 11)," 3GPP TS 36.304 V11.7.0 (Dec. 2015).

Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.4.0 (Mar. 2015).

Third Generation Partnership Project, "Technical Specification Group Core Network and Terminals; Mobile radio interface Layer 3 specification; Core network protocols; Stage 3 (Release 10)," 3GPP TS 24.008 V10.15.0 (Sep. 2014).

Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.14.0 (Mar. 2015).

Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.15.0 (Sep. 2014).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.8.0 (Mar. 2015).

Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.12.0 (Mar. 2016).

Third Generation Partnership Project, "Technical Specification Group Core Network and Terminals; Mobile radio interface Layer 3 specification; Core network protocols; Stage 3 (Release 9)," 3GPP TS 24.008 V9.12.0 (Sep. 2012).

Third Generation Partnership Project, "Technical Specification Group Core Network and Terminals; Mobile radio interface Layer 3 specification; Core network protocols; Stage 3 (Release 11)," 3GPP TS 24.008 V11.14.0 (Mar. 2015).

Third Generation Partnership Project, "Technical Specification Group Core Network and Terminals; Mobile radio interface Layer 3 specification; Core network protocols; Stage 3 (Release 11)," 3GPP TS 24.008 V11.16.0 (Sep. 2015).

Third Generation Partnership Project, "Technical Specification Group Core Network and Terminals; Mobile radio interface Layer 3 specification; Core network protocols; Stage 3 (Release 12)," 3GPP TS 24.008 V12.8.0 (Dec. 2014).

Third Generation Partnership Project, "Technical Specification Group Core Network and Terminals; Mobile radio interface Layer 3 specification; Core network protocols; Stage 3 (Release 13)," 3GPP TS 24.008 V13.5.0 (Mar. 2016).

Third Generation Partnership Project, "Technical Specification Group Core Network and Terminals; Mobile radio interface Layer 3 specification;Core network protocols; Stage 3 (Release 12)," 3GPP TS 24.008 V12.12.0 (Dec. 2015).

Third Generation Partnership Project, "Technical Specification Group Core Network and Terminals; Mobile radio interface Layer 3 specification; Core network protocols; Stage 3 (Release 13)," 3GPP TS 24.008 V13.1.0 (Mar. 2015).

Third Generation Partnership Project, "Technical Specification Group Core Network and Terminals; Mobile radio interface Layer 3 specification; Core network protocols; Stage 3 (Release 12)," 3GPP TS 24.008 V12.9.0 (Mar. 2015).

Third Generation Partnership Project, "Technical Specification Group Services and System Aspects; General Packet Radio Service (GPRS); Service description; Stage 2 (Release 13)," 3GPP TS 23.060 V13.2.0 (Mar. 2015).

Third Generation Partnership Project, "Technical Specification Group Services and System Aspects; General Packet Radio Service (GPRS); Service description; Stage 2 (Release 10)," 3GPP TS 23.060 V10.14.0 (Sep. 2014).

Third Generation Partnership Project, "Technical Specification Group Services and System Aspects; General Packet Radio Service (GPRS); Service description; Stage 2 (Release 11)," 3GPP TS 23.060 V11.12.0 (Dec. 2014).

Third Generation Partnership Project, "Technical Specification Group Services and System Aspects; General Packet Radio Service (GPRS); Service description; Stage 2 (Release 13)," 3GPP TS 23.060 V13.6.0 (Mar. 2016).

Third Generation Partnership Project, "Technical Specification Group Services and System Aspects; General Packet Radio Service (GPRS); Service description; Stage 2 (Release 12)," 3GPP TS 23.060 V12.8.0 (Mar. 2015).

Third Generation Partnership Project, "Technical Specification Group Services and System Aspects; Architecture enhancements to facilitate communications with packet data networks and applications (Release 12)," 3GPP TS 23.682 V12.2.0 (Jun. 2014).

Third Generation Partnership Project, "Technical Specification Group Services and System Aspects; Architecture enhancements to facilitate communications with packet data networks and applications (Release 11)," 3GPP TS 23.682 V11.5.0 (Sep. 2013).

Third Generation Partnership Project, "Technical Specification Group Services and System Aspects; Architecture enhancements to facilitate communications with packet data networks and applications (Release 13)," 3GPP TS 23.682 V13.1.0 (Mar. 2015).

Third Generation Partnership Project, "Technical Specification Group Services and System Aspects; Architecture enhancements to facilitate communications with packet data networks and applications (Release 12)," 3GPP TS 23.682 V12.3.0 (Mar. 2015).

Third Generation Partnership Project, "Technical Specification Group Services and System Aspects; Architecture enhancements to facilitate communications with packet data networks and applications (Release 12)," 3GPP TS 23.682 V12.4.0 (Jun. 2015).

(56) References Cited

OTHER PUBLICATIONS

Third Generation Partnership Project, "Technical Specification Group Services and System Aspects; Architecture enhancements to facilitate communications with packet data networks and applications (Release 13)," 3GPP TS 23.682 V13.5.0 (Mar. 2016).

Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.13.0 (Dec. 2014).

Third Generation Partnership Project, "Technical Specification Group Services and System Aspects; Study on system impacts of extended Discontinuous Reception (DRX) cycle for power consumption optimization (Release 13)," 3GPP TR 23.770 V13.0.0 (Sep. 2015).

Third Generation Partnership Project, "Technical Specification Group Services and System Aspects; Study on System Impacts of Extended DRX Cycle for Power Consumption Optimization; (Release 13)," 3GPP TR 23.770 V0.1.0 (Feb. 2015).

Third Generation Partnership Project, "Technical Specification Group Radio Access Network; volved Universal Terrestrial Radio Access (E-UTRA); Radio Resource Control (RRC); Protocol specification (Release 8)," 3GPP TS 36.331 V8.21.0 (Jun. 2014).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.5.0 (Mar. 2015).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.16.0 (Mar. 2015).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.15.0 (Mar. 2016).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.11.0 (Mar. 2015).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.19.0 (Dec. 2015).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.18.0 (Jun. 2014).

Third Generation Partnership Project, "Technical Specification Group Radio Access Network; Evolved Universal Terrestrial Radio Access (E-UTRA); Radio Resource Control (RRC); Protocol Specification (Release 12)," 3GPP TS 36.331 V12.9.0 (Mar. 2016).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.5.0 (Mar. 2015).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.9.0 (Mar. 2016).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.5.0 (Mar. 2015).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.9.0 (Mar. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).

* cited by examiner

SYSTEM ENHANCEMENTS FOR USING POWER SAVING

CROSS REFERENCE TO RELATED APPLICATION

This application is a continuation of U.S. Non-Provisional application Ser. No. 15/088,895 filed on Apr. 1, 2016, which claims the benefit of U.S. Provisional Application No. 62/142,764, filed on Apr. 3, 2015, U.S. Provisional Application No. 62/161,550, filed May 14, 2015, and U.S. Provisional Application No. 62/201,900, filed Aug. 6, 2015, all of which are incorporated by reference as if fully set forth herein.

BACKGROUND

In wireless systems, such as Third Generation Partnership Project (3GPP) systems, a wireless transmit/receive unit (WTRU) in IDLE mode may use Discontinuous Reception (DRX) to reduce power consumption. With DRX, the WTRU may wake up on its Paging Frame (PF) and/or Paging Occasion (PO) to monitor a Physical Downlink Control Channel (PDCCH) for a possible paging message from the network.

SUMMARY

Methods and apparatus may be used for selecting power saving mechanisms in a wireless transmit/receive unit (WTRU). For example, a WTRU may support at least power saving mode (PSM) and/or extended discontinuous reception (eDRX) mode. The WTRU may send a request message including parameters associated with the supported power saving mechanisms, such as an active time for PSM and a preferred DRX value for eDRX mode. The WTRU may receive an accept message including at least one selected parameter that indicates the power saving mechanism for the WTRU selected by the network (NW). The WTRU may activate the selected power saving mechanism, and may start a validity timer to define the duration of use of the selected power saving mechanism. In another example, a WTRU configured to use eDRX may receive paging signals for system information (SI) change over a prolonged Broadcast Control Channel (BCCH) modification period, such that the paging signals may include a flag to indicate paging message that are for eDRX WTRUs only.

BRIEF DESCRIPTION OF THE DRAWINGS

A more detailed understanding may be had from the following description, given by way of example in conjunction with the accompanying drawings wherein.

DETAILED DESCRIPTION

Figure 1A:
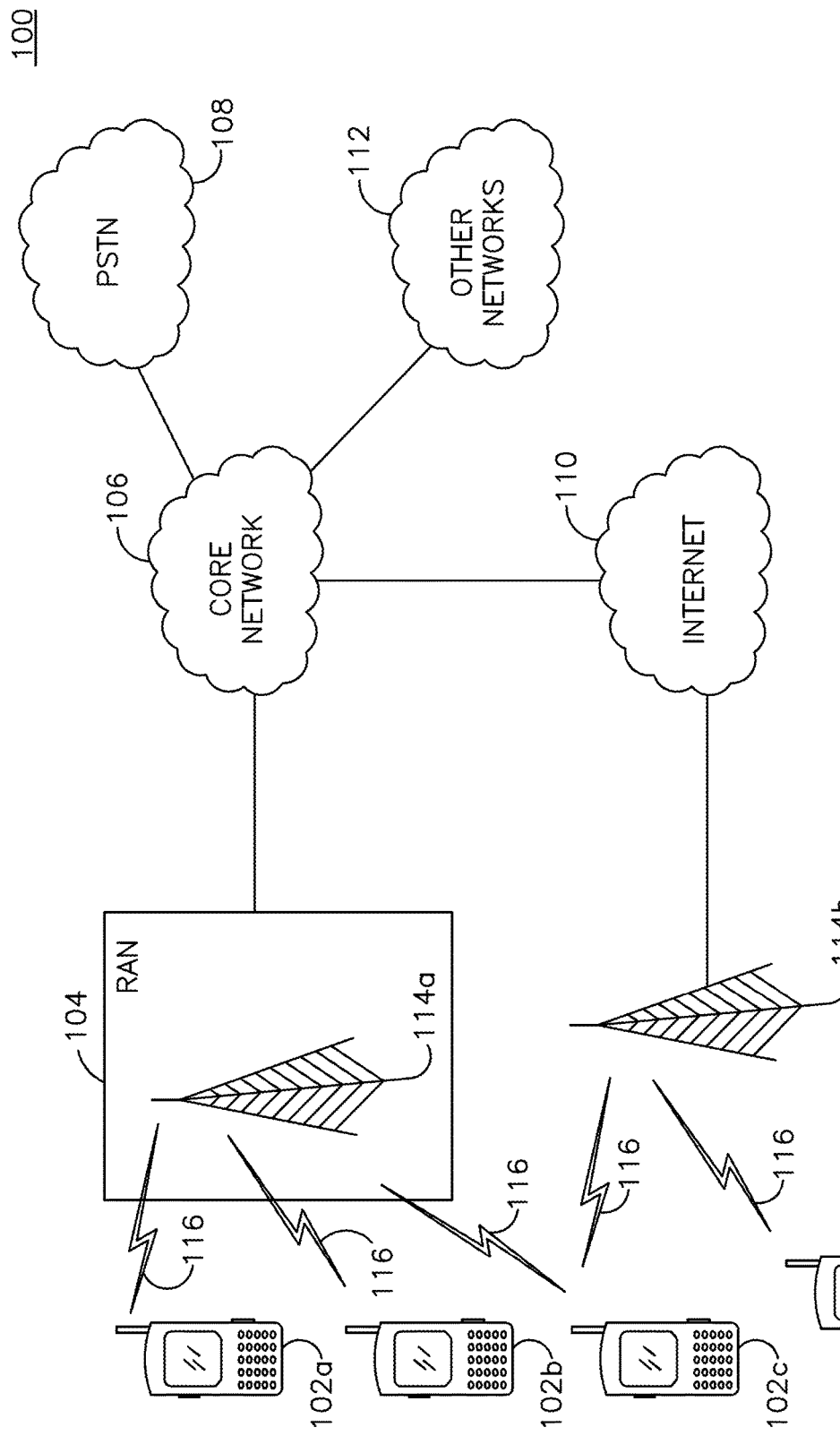
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
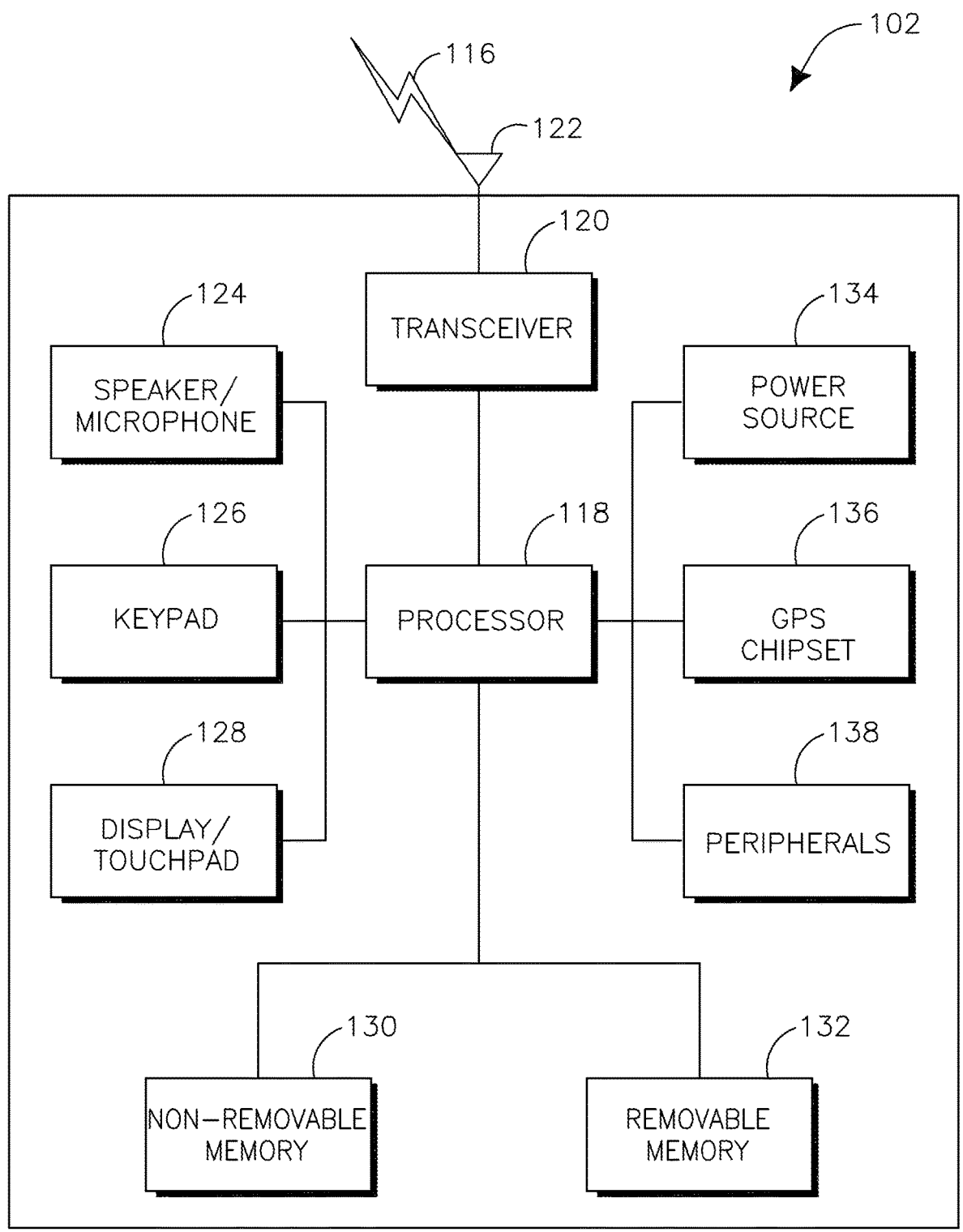
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
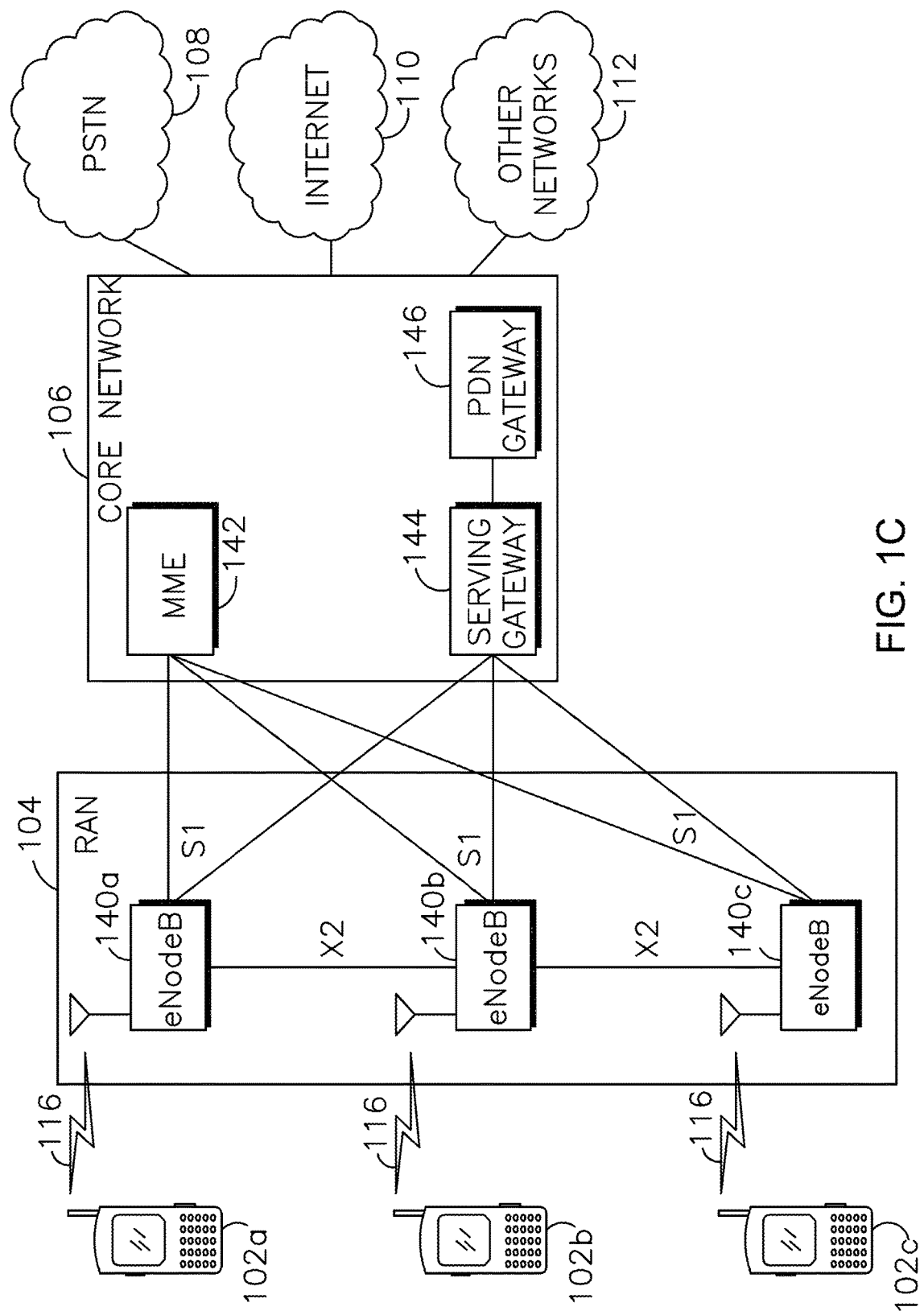
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway (SGW) 144, and a packet data network (PDN) gateway (PGW) 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In Discontinuous Reception (DRX) modes, one paging frame (PF) may be, for example, one radio frame comprising multiple subframes (e.g. ten subframes), which may contain one or multiple paging occasions (POs). Each PO may be one subframe. The PFs and POs may be periodic and the period may be referred to as the DRX cycle or the paging cycle.

Figure 2:
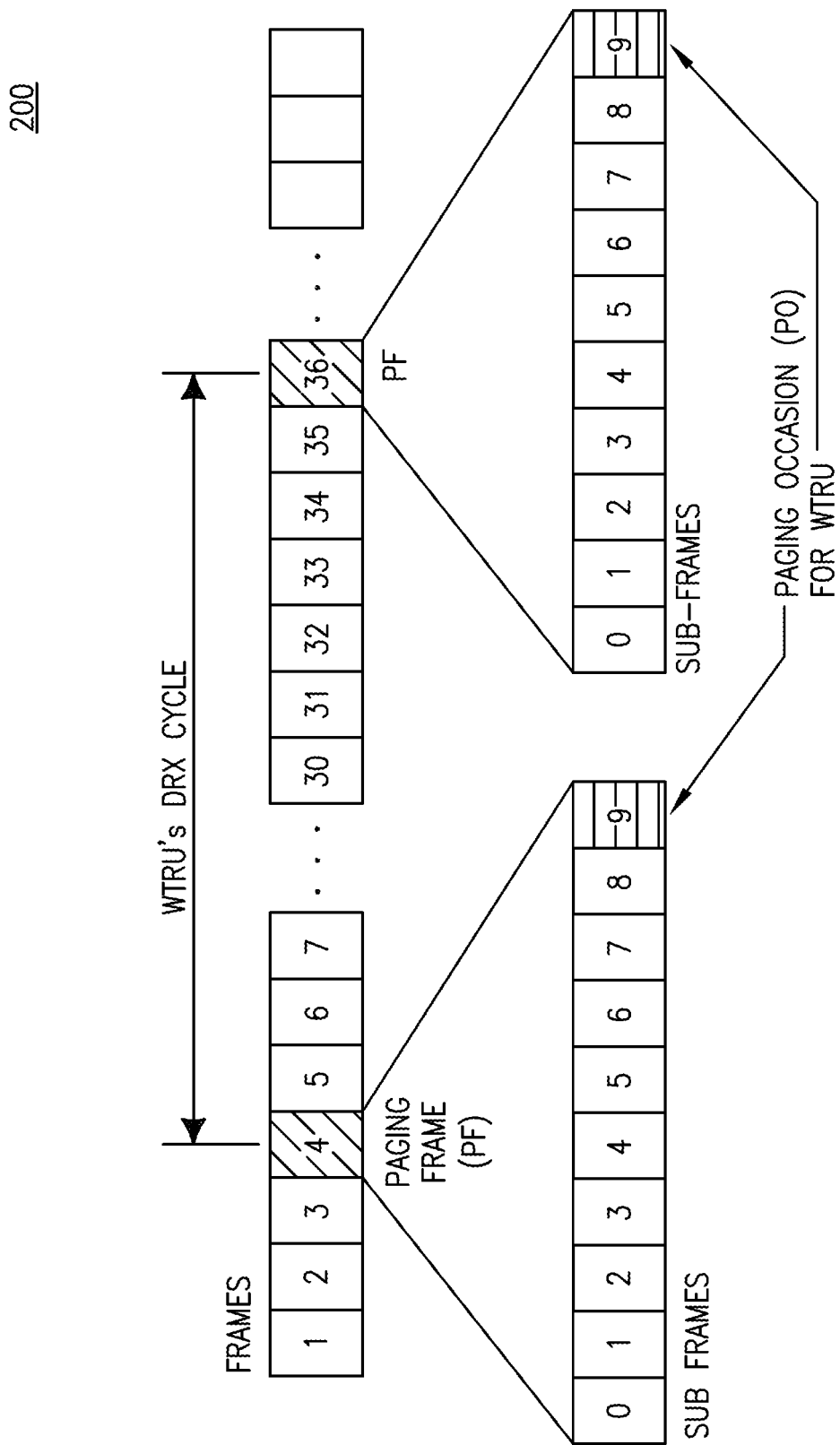
FIG. 2 is a diagram of an example paging cycle.

FIG. 2 is a diagram of an example paging cycle 200. The WTRU's DRX cycle may define which frames are used for paging frames. For example, a PF may occur on a cycle of every T=32 frames (e.g. frames 4 and 36 are shown as PFs in FIG. 2). A subframe may be designated as a PO within the PF. Examples of subframes that may be used as POs include subframes 0, 4, 5 or 9 (e.g. subframe 9 is used as a PO in FIG. 2). A WTRU may have one PO per DRX cycle, or may have more than PO per DRX cycle. A PF and PO may be determined using a formula and/or parameters, which may be provided in broadcasted system information for example.

In an example, an eNB may broadcast a default DRX cycle in the system information block 2 (SIB2) for some or all of the WTRUs in the cell. The default DRX cycle may be 32, 64, 128 or 256 radio frames, for example. The WTRU may request to use a WTRU-specific DRX cycle by including a proposed DRX cycle in the attach request message that it sends to the eNB. In an example, the eNB and the WTRU may use the shortest cycle among the WTRU-specific DRX cycle and the default DRX cycle to calculate the PF and/or PO for the WTRU.

In an example, the maximum DRX cycle may be 2.56 seconds, which may not be efficient for WTRUs that have stringent power constraints and/or infrequent downlink data transmission. The Third Generation Partnership Project (3GPP) has been working on more aggressive power saving mechanisms, including, but not limited to, the following power saving mechanisms: Power Saving Mode (PSM); and extended DRX (eDRX). Other examples of power saving mechanisms include DRX and adjusted measurement reporting, which may be used by WTRUs in Idle and/or Connected mode. Power saving mechanisms are referred to in general, and examples described herein may refer to PSM and/or eDRX as specific types of power saving mechanisms, although the examples described herein may similarly apply to other power saving mechanisms not mentioned.

In PSM, a WTRU may turn off its radio (similar to a power-off) but may remain registered with the network (NW), such that reattachment or reestablishment of PDN connections may be avoided. The WTRU may enter PSM after a time period (e.g. the "Active Time" period) after the WTRU exits Connected mode. The WTRU may only be reachable by the terminating services during the Active Time period. In the description herein, network and MME may be used interchangeably.

In an example, the Active Time may be negotiated between the WTRU and NW during the Attach or TAU procedure. The WTRU may include a proposed Active Time value in the Attach Request or TAU Request message, and the NW may accept or change the Active Time value in the Attach Accept or TAU Accept message. In an example, the Active Time parameter may be of type General Packet Radio Service (GPRS) Timer 2, and may range from two seconds to 186 minutes. In another example, a minimum recommended length for the Active Time period may be the time allowing for the message waiting flag in the MME and/or Serving GPRS Support Node (SGSN) to trigger the Short Message Service Centre (SMSC) via the Home Subscriber Server (HSS) to deliver an short message service (SMS) message to the MME/SGSN, which may be for example Active Time=2 DRX cycles+10 seconds.

eDRX may achieve more aggressive power saving by extending the maximum DRX cycle (e.g. 2.56 seconds) to a longer value. For example, the DRX cycle for eDRX may be up to 10.24 seconds or longer. When described herein, eDRX may be described in the context of Idle mode, however eDRX may similarly apply to Idle and/or Connected mode.

Similar to the WTRU-specific DRX negotiation, the WTRU may negotiate the eDRX cycle during an Attach procedure or a TAU procedure. The WTRU may include a proposed eDRX cycle in an Attach Request message and/or a TAU Request message, and the NW may accept or modify the proposed value of the Active Time parameter and may include the same or modified Active Time value in the Attach Accept message or TAU Accept message.

In an example, the eNB may also send or broadcast a default eDRX cycle so that the WTRU may not negotiate the eDRX cycle value with the NW. In this case, the WTRU and the NW may or may not communicate with each other to activate/deactivate eDRX using non-access stratum (NAS) procedures, for example. In an example, if eDRX is activated for a WTRU and there is a paging message intended for the WTRU, the MME may include an eDRX indication and/or an eDRX value in the S1AP paging message so that the serving eNB may know that it should use the eDRX cycle to calculate the PF and PO for the WTRU.

3GPP systems may provide unique service capabilities and information including, but not limited to, the following examples: communication capabilities; WTRU's subscription data; real-time user information (e.g. location and presence); Quality of Service (QoS) information; policy information; and/or security information. 3GPP Mobile Network Operators (MNO) may offer value added services by exposing these 3GPP service capabilities to external application providers, businesses, and/or partners using a web-based application programming interface (API). 3GPP MNOs may combine other internal or external services with their network capabilities to provide richer, composite API services to their partners. This may provide mobile network intelligence to applications, which may allow new, profitable business relationships to be created between MNOs and a wide range of external providers of enterprise/business solutions and/or web-based services and/or content.

Figure 3:
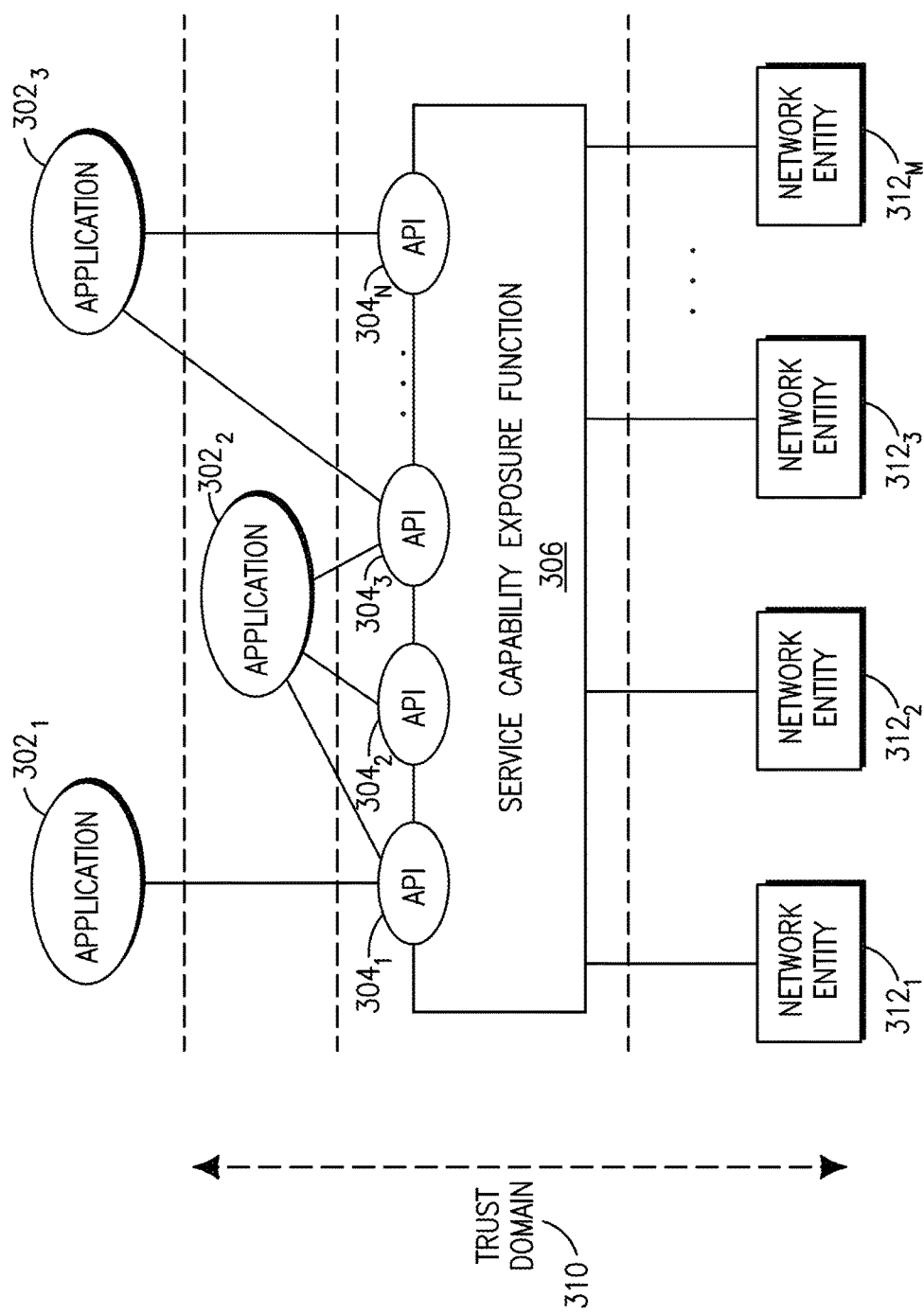
FIG. 3 is a system diagram of an example high-level service capability exposure system architecture.

FIG. 3 is a system diagram of an example high-level service capability exposure system architecture 300. The example system architecture 300 may include, but is not limited to include, any of the following components or elements, with may be part of a trust domain 310: a Service Capability Exposure Function (SCEF) 306; Applications $302_1 \ldots 302_3$; APIs $304_1 \ldots 304_N$; and/or network entities $312_1 \ldots 312_M$.

The SCEF 306 may provide a means to securely expose the services and capabilities provided by 3GPP network entities/interfaces $312_1 \ldots 312_M$. The SCEF 306 may provide a means for the discovery of the exposed service capabilities. The SCEF 306 may provide access to network capabilities through homogenous network APIs $304_1 \ldots 304_N$, which may be defined for example by Open Mobile Alliance (OMA), Groupe Speciale Mobile Association (GSMA), and other standardization bodies. The SCEF 306 may abstract the services from underlying 3GPP network interfaces and protocols from network entities $312_1 \ldots 312_M$.

Power saving features may make WTRUs unreachable for mobile terminated data and/or may cause high latency communication. The period of time for which these devices, employing aggressive power saving features, are unreachable may not be known to the application server (AS). These devices may be made reachable for terminated data as per the needs from the AS.

Example mechanisms for being able to reach the WTRU for terminated data include, but are not limited to include, the following: the SGW may buffer a terminated packet when the WTRU is not reachable, such that the packet may be forwarded to the WTRU later when it makes contact with the network; and/or the MME may set a flag when the WTRU is not reachable for terminated data, such that the MME may later inform other network nodes (e.g. HSS, SCEF) when the WTRU makes contact with it, and the other network nodes may inform the AS that the WTRU may now be reachable. This may result in terminated data be forwarded from the AS towards the WTRU.

NW-initiated GPRS tunneling protocol (GTP) for the core network (GTP-C) message retransmissions are described herein. When the packet data network gateway (PGW) and/or the serving gateway (SGW) initiates a GTP-C procedure by sending a request message (e.g. "create session request" message), the PGW/SGW may start a T3-Response timer to wait for a response. If the T3-Response timer expires before a response is received, the corresponding request message may be resent by the PGW/SGW on the S5/S8 interface or S11 interface, for example. The T3-Response timer may be a global setting (i.e. not WTRU-specific timer), and the exact value may depend on configuration, and may be a few seconds, for example.

With the introduction of eDRX, the DRX cycle may be extended at least up to 10.24 seconds or more, which increases the risk of GTP-C message retransmissions for those eDRX-activated WTRUs and may lead to the signaling overload in the CN and/or failures of the GTP-C procedure. Increasing the value of the T3-Response timer may not resolve the issue, which may impact the non-eDRX WTRUs. Applying WTRU-specific T3-Response timers may not resolve the issue either, and may introduce extra signaling to update the value of the timer and/or may reduce the PGW/SGW signaling capacity.

Selection and change of power saving mechanism is described herein. In an example, if a WTRU and its network support both PSM and eDRX, there may be a choice to activate PSM and/or eDRX for power saving (i.e. one or the other, or both at the same time). The WTRU and/or the NW may decide on the power saving mechanism(s). For example, the WTRU may be assisted by the NW to select the power saving, such that the decision may depend on the user subscription profile, and/or application pattern characteristics. The WTRU and the NW may negotiate with each other on the selection of the power saving mechanism. Accordingly, the WTRU-NW signaling (e.g. NAS signaling) may support such a negotiation.

In an example, when PSM and/or eDRX are activated in a WTRU, the WTRU may need to change the power saving mechanism when the conditions change. Example conditions that could trigger a change for more efficient power saving mechanisms include, but are not limited to include, any of the following: a change of traffic pattern; a change of the WTRU's power level; and/or mobility events (e.g. redirected to a dedicated CN that may not support the current mechanism). Thus, negotiation procedures may enable the WTRU and NW to negotiate the change of the activated power saving mechanism. In an example, the simultaneous activation of multiple power saving mechanisms (e.g. PSM and eDRX) may be used to efficiently reduce power consumption.

Reporting of WTRU reachability information to an AS is described herein. The activation of the PSM and/or eDRX features in a WTRU may change the WTRU's reachability pattern or introduce latency for terminating services. Therefore, it may be beneficial to notify the AS and/or Service Capability Server (SCS) regarding the power saving mechanisms at the WTRU.

In an example mechanism, event triggers may be monitored and/or WTRU reachability information may be reported to the AS/SCS. This example mechanism may use a "Store and Forward" (S&F) function, which may reside with the SCEF for example, and when there is a downlink data delivery request, the SCEF/S&F function may send requests for monitoring WTRU reachability (e.g. one-time or continuously) to the MME/SGSN. When the WTRU becomes reachable, a "WTRU reachable" monitoring event may be triggered, and the report may be sent to the SCEF/S&F function. Based on this reachability information, the S&F may forward the stored downlink data to the WTRU. Another example mechanism may be based on a policy and charging control (PCC) framework. Such a mechanism may be based on the procedure for AF/AS to subscribe to the event reporting from the policy and charging rule function (PCRF) over Rx interface, for example.

In an example, a "WTRU reachable" event may be triggered by WTRU NAS activity such as a WTRU-triggered Service Request, and/or a TAU Request. This kind of event makes sense for PSM WTRUs when they exit PSM mode with some WTRU-triggered activity. An Idle WTRU with eDRX activated may still be considered reachable, with or without WTRU-triggered NAS activity. In other words, the activation/deactivation of the eDRX feature may not change a WTRU's reachability so no reachable event may be triggered. Although eDRX-activated WTRUs may technically be reachable, there may be great delays for downlink delivery. This latency information may be critical to the applications but may not be simply acquired through reachable event reports. Using a reachable-event based mechanism, when a reachable event is reported to the SCEF or AS/SCS, there may be no downlink activity. At the time that the AS needs to initiate a downlink delivery, the WTRU's reachability may have already changed.

In an example, connected Mode eDRX may cause NAS Timer Expiry. For example, for a connected WTRU, the (e)DRX may be configured and activated by the eNB. The exact timing of an On_Duration period during which the eNB may transmit data may be known at the WTRU and/or eNB, but may not be known at the MME. In this case, when a MME initiates a NAS procedure towards a connected WTRU, which may have (e)DRX activated, it may be unknown when the message will be delivered to the WTRU. This may be acceptable in the case that the longest DRX cycle value for connected mode is 2.56 seconds and the network side NAS timers are around 6~10 seconds. However, if an eDRX cycle value longer than 10 seconds is configured for a connected WTRU, the network initiated NAS procedures may risk repeated timer expires.

In an example scenario, a mobile terminated call request may be received by a WTRU from the circuit switched (CS) domain. When a WTRU is configured for registration in both packet switched (PS) and CS domains, the WTRU may operate in a mode that is referred to as CS/PS mode. In this case, when the WTRU registers in LTE, it may perform a combined registration (e.g. Attach and/or TAU procedure). In other words, the WTRU may send a registration request message to the MME that contains a request to register in both domains. The MME may forward the CS part of the registration request message (e.g. the Location Update Request) to the mobile switching center (MSC) and/or visitor location register (VLR). If the MSC/VLR accepts the received registration request, the WTRU may receive an Attach Accept message and/or a TAU Accept message confirming the PS and/or CS registrations.

Further to the above example scenario, any mobile terminated (MT) call that comes to the MSC/VLR may result in the MSC (and/or VLR) sending a paging message to the MME. If the WTRU is in Idle Mode, the MME may start a paging procedure. However, this may not be needed if the WTRU is in Connected Mode, because a (NAS) signaling connection between the MME and the WTRU may already exist. In this latter case, the MME may send a message, such as a "CS Service Notification" message, to inform the WTRU that MME has a mobile terminated (MT) call request from the CS domain. Because CS Fallback may be a time consuming process, the MME may send a "Service Request" message to the MSC/VLR once the MME receives the Paging message from the MSC/VLR for a WTRU in Connected Mode. This may assist a call setup process, such that the MSC may start a timer in order to divert the MT call to, for example, a voice mailbox, in case the WTRU does not reply to the paging within a certain time interval. The above procedure may be referred to as "Call Forwarding on No Reply", for example.

In an example scenario, a WTRU may be in Connected Mode and eDRX may be activated. Assuming that the MME may delay its messages to the eNB in the DL direction, and assuming that the duration of an eDRX cycle may be greater than or equal to ten seconds, the MME may not send the CS Service Notification for about ten seconds. When the MME sends the CS Service Notification message, the WTRU may send the extended service request (ESR) message back to the MME, perform some measurements, and/or get redirected to the CS domain. Once in the CS domain, the WTRU may perform a location update, suspend PS bearers, and/or send a Paging Response to the MSC/VLR. These procedures in the CS domain may take a few seconds. Together with the eDRX cycle duration, there may be a delay of 12-15 seconds before the MSC sends a "ringing tone" back to a user who started the call. This may be considered a very long time when making a phone call, during which the user may hang up the call. In addition, the WTRU may have gone through extensive CS fallback (FB) signaling, moved to GERAN/UTRAN, and/or faced a dropped call, for example.

In another example, when a network changes system information (SI), the paging message, which may include for example a systemInfoModification identification or element, may be used to inform WTRUs (in Idle and/or Connected) about a system information change. The NW may send a paging message for SI change notification during a preconfigured period, such as a Broadcast Control Channel (BCCH) modification period. For example, the SI change may start at the boundary of the next BCCH modification period. The length of BCCH modification period may be defined as modificationPeriodCoeff×defaultPagingCycle.

In an example, the length of the BCCH modification period may be shorter than the length of an eDRX cycle used by Idle WTRUs. These Idle WTRUs may be at risk of missing the Paging for SI change notification. Therefore, mechanisms may be used to enable WTRUs using eDRX to reliably receive Paging messages for SI change notification.

Approaches for using power saving mechanism may be described herein in the context of LTE communication systems and signaling, however these mechanisms may be used in other wireless communication systems and UMTS systems in particular. For example, when a procedure is described with reference to an LTE system entity such as the MME, a similar procedure may apply to a corresponding UMTS system entity such as the SGSN. In another example, when LTE NAS signaling such as the Attach Request message or Tracking Area Update Request message is described, similar signaling can be used in a corresponding UMTS NAS signaling an Attach Request message or Routing Area Update Request message.

Figure 4:
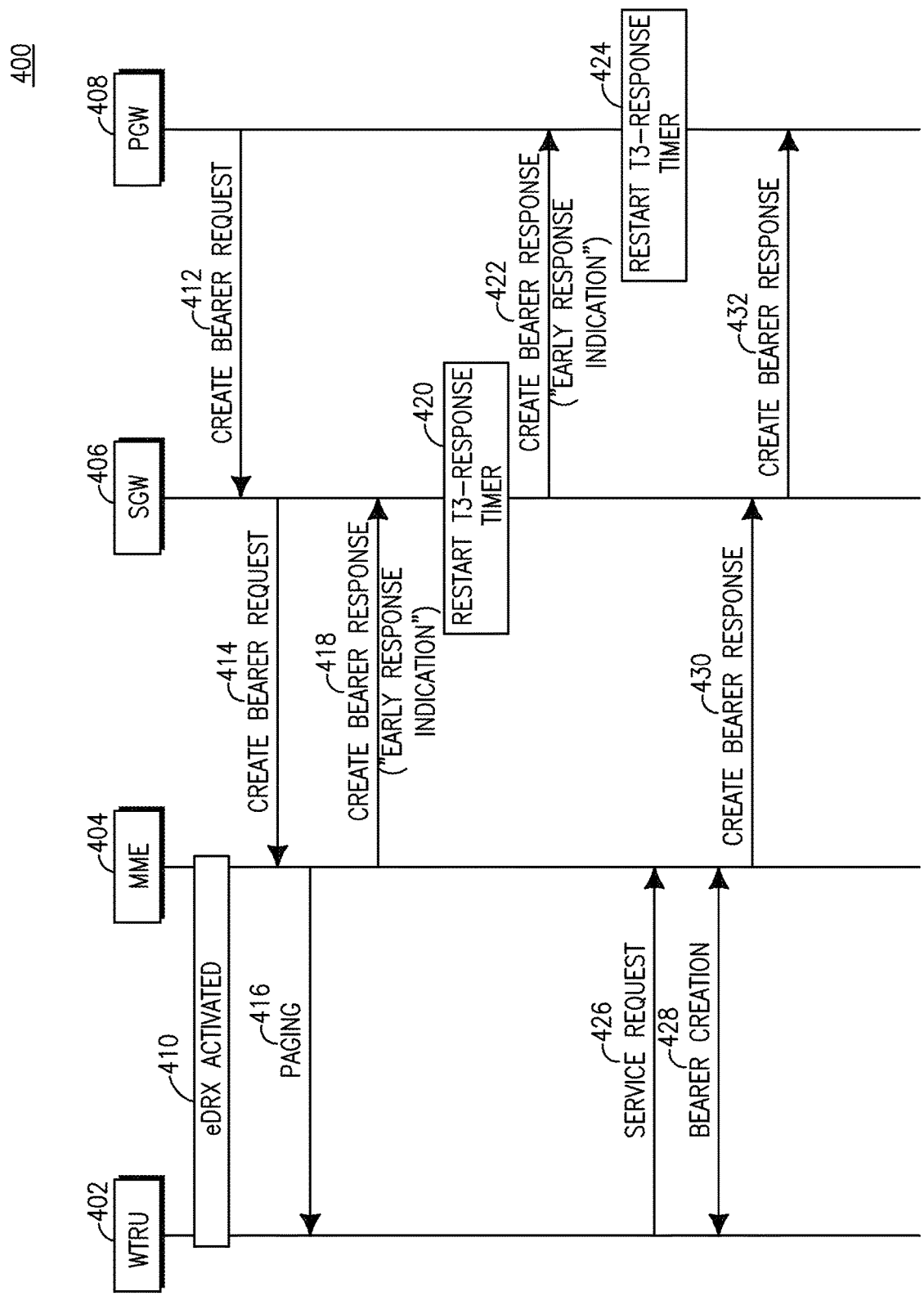
FIG. 4 shows a flow diagram of an example General Packet Radio Service (GPRS) tunneling protocol (GTP) for the core network (GTP-C) request procedure.

In an example mechanism, an early response of the NW-initiated GTP-C request may be used, which may be used to avoid PGW/SGW retransmission of GTP-C requests. FIG. 4 shows a flow diagram of an example GTP-C request procedure 400. At 410, eDRX may be activated in the WTRU 402 by the MME 404. The PGW 408 may send a create bearer request message 412 to the SGW 406, and the create bearer request message 414 may be forwarded by the SGW 406 to the MME 404. For example, the create bearer request message 412/414 may be NW-initiated GTP-C request. When the MME 404 receives the create bearer request message 414, and in the case that eDRX has been activated for WTRU 402 (e.g. eDRX activation 410), the MME 404 may respond with a corresponding create bearer response message 418.

The MME 404 may send the create bearer response message 418 before a service request 426 (or extended service request message) may be received by the MME 404 from the WTRU 402, and the MME 404 may include an early response indication in the create bearer response message 418. The time that MME 404 may choose to send the create bearer response message 418 may take into account the T3-Response timer so that a create bearer response message 422 may arrive at SGW 406 and PGW 408 before the T3-response timer expires.

In an example, an early response indication may be an information element (IE) in a create bearer response message 418/422, or a cause code may be chosen to indicate the early response. In an example, certain fields of the create bearer response message 418/422, such as bearer context, may not be available so the MME 404 may leave these fields blank or fill them with a reserved value. The blank or special bearer context may also serve as an implicit early response indication if no explicit indication is included.

Upon receiving the create bearer response message 418 with an early response indication, at 420 and 424, the SGW 406 and/or PGW 408 may restart the T3-Response timer and may wait for a future "real" create bearer response 430 and 432 between the MME 404 and SGW 406, and SGW 406 and PGW 408. Depending on the durations of the eDRX cycle and/or T3-Response timer, the MME 404 may repeat sending an early response type message a few times until a "real" create bearer response message 430/432 is possible (i.e. until a WTRU service request message 426 is received at the MME 404) or the procedure fails. Following a service request message 426 from the WTRU 402 to the MME 404, bearer creation 428 may occur between the WTRU 402 and the MME 404. In an example, if the WTRU 402 is in Idle mode when the create bearer procedure is initiated, the MME 404 may send a paging signal 416 to the WTRU 402 to bring the WTRU to Connected mode to complete the bearer creation.

Figure 5:
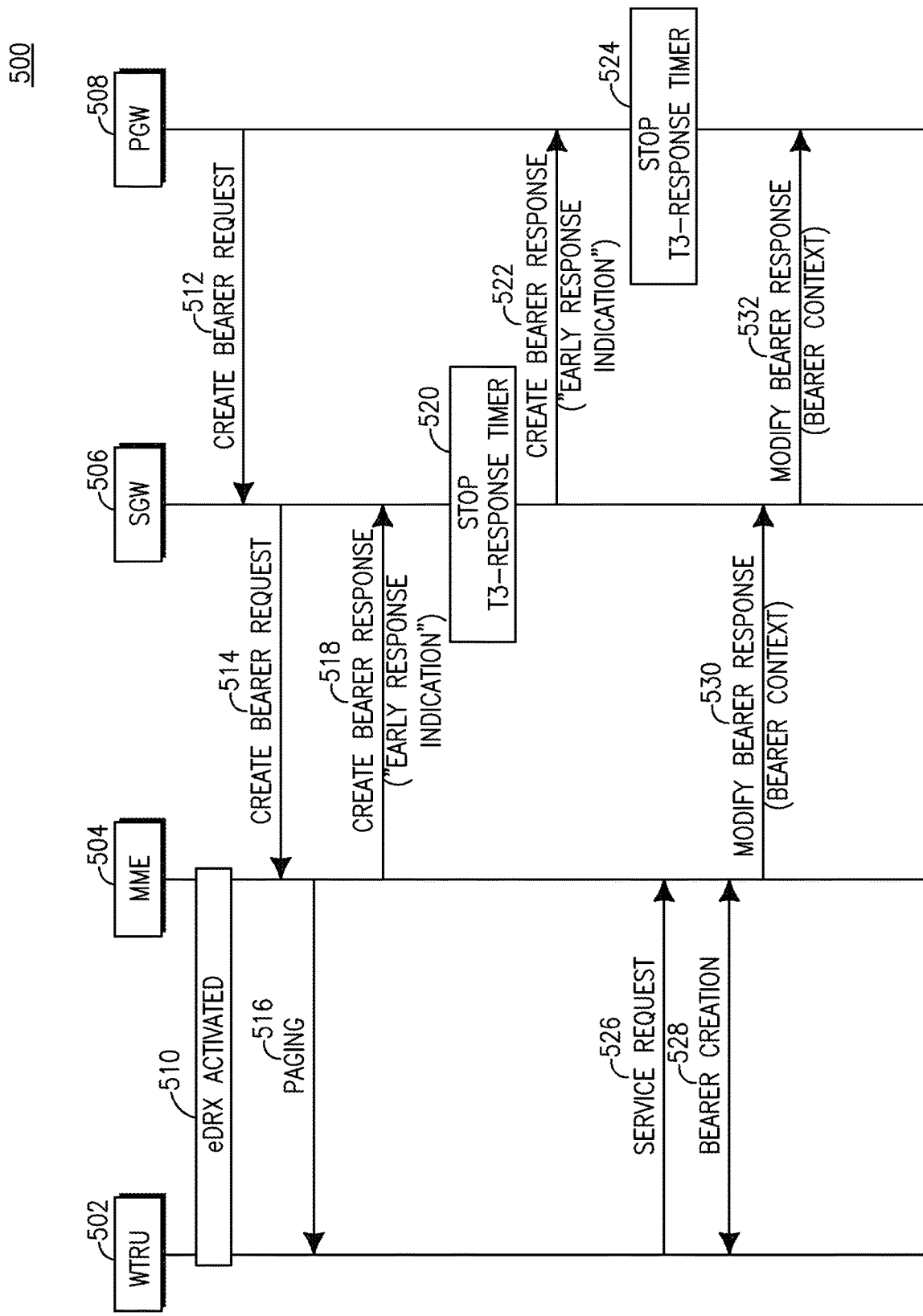
FIG. 5 shows a flow diagram of another example GTP-C request procedure.

FIG. 5 shows a flow diagram of another example GTP-C request procedure 500. eDRX 510, In the example of FIG. 5, when the SGW 506 or PGW 508 receives the create bearer response 518 and 522 with an (explicit or implicit) early response indication, the SGW 506 or PGW 508 may stop the T3-Response timer 520 and 524 and because the needed bearer context (e.g. S1-U eNB TEID, S1-U SGW TEID) may not be available, the SGW 506 or PGW 508 may withhold the downlink data. When the WTRU 502 becomes reachable and the NW triggered service request message 526 procedure and bearer creation procedures (i.e. sending of bearer creation message 528 and modify bearer response messages 530 and 532) are completed, the MME 504 may initiate a modify bearer request procedure (i.e. bearer creation message exchange 528, and modify bearer response messages 530 and 532) to provide the correct bearer context. After the modify bearer request procedure is completed, the downlink data can be transmitted.

In the examples in FIGS. 4 and 5, depending on the various procedures that the PGW (408/508) initiated, the messages that follow the create bearer response messages with "early response" indication may be different. For example, in FIG. 5 the Modify Bearer Request procedure may be initiated after an early response message 518/522 to the Create Bearer Request 514. If the PGW 508 initiated procedure is a Delete Bearer Request procedure (not shown) and after MME 502 has responded with Delete Bearer Response with "early response" indication, the MME 502 may initiate the Delete Bearer Command procedure to release the bearer.

In the examples of FIGS. 4 and 5, an eNB (not shown) may send a response message to the MME (e.g. 404/504) after the MME receives the paging message (e.g. 416/516) if the eNB determined that there may be a significant delay before the paging opportunity is available for the WTRU (e.g. 402/502). The eNB may include an indication in a paging response message that the paging would or would not be delayed and may also provide an estimation of time length before the WTRU is available. Because the MME does not know which eNB serves the WTRU, and it is not efficient for all eNBs to respond to the paging message when a response is not needed, the MME may ask the recent serving eNB to report information such as whether the paging would or would not be delayed and/or an estimation of time length before the WTRU is available (e.g. if the MME has the recent serving eNB identifier in the context).

The MME may determine its actions based on the indication or estimated time length information received in the paging response message. For example, if the WTRU is reachable soon, the MME may not initiate the "early response" indication as described above and/or may wait for the completion of the bearer establishment and send the real response to the SGW/PGW. In another example, if the WTRU will not be available soon, the MME may initiate the "early response" as described above. In another example, if the WTRU will not be available for a very long time, the MME may respond with a rejection message to the SGW/PGW. In another example, the MME may forward the estimated time length before the WTRU is reachable to the MME in an early response message and/or rejection message to the SGW/PGW.

Example procedures for selection of power saving mechanism are described herein. The example procedures may be used to select and activate one or more power saving mechanisms, including PSM and/or eDRX. Although PSM and eDRX are used as examples, any other power saving mechanism may be used.

Figure 6:
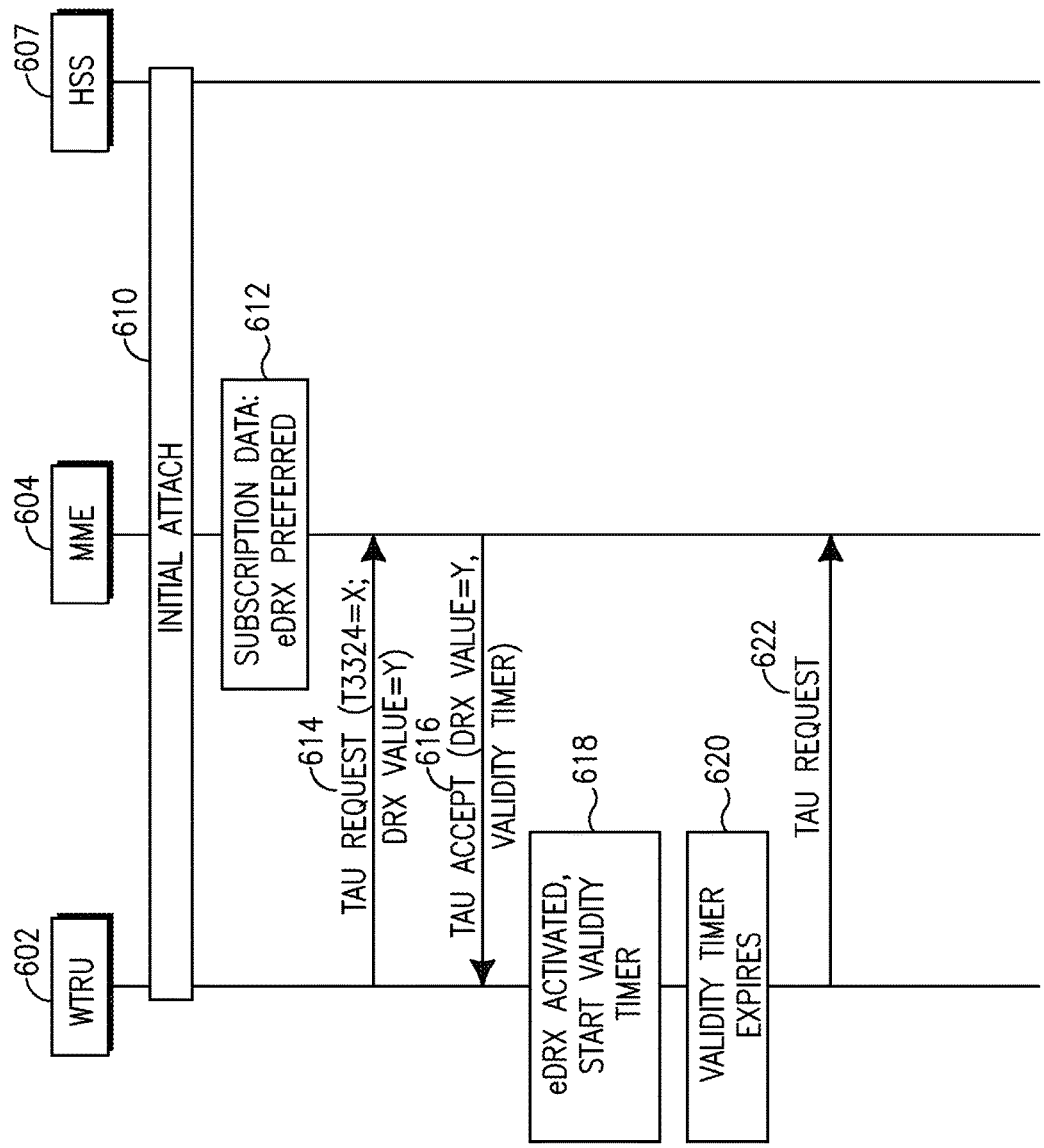
FIG. 6 shows a flow diagram of an example power saving mechanism selection procedure.

FIG. 6 shows a flow diagram of an example power saving mechanism selection procedure 600. An initial attachment procedure 610 may occur between the WTRU 602, the MME 604 and the HSS 607 to attach the WTRU 602 to the NW. At 612, the MME 604 may update the WTRU 602's subscription data, for example to indicate that eDRX is a preferred power saving mechanism.

In the example power saving mechanism selection procedure 600, if the WTRU 602 supports multiple power saving mechanisms, for example PSM and eDRX, and none of the power saving mechanisms have been activated at the WTRU 602, the WTRU 602 may include a PSM Active Time value (e.g. T3324) and/or a preferred DRX value (e.g. DRX value=Y) in the Attach Request or TAU Request message 614 when the Attach or TAU procedure is initiated. The inclusion of both the Active Time for PSM and the preferred DRX value for eDRX in the Attach or TAU Request message 614 may be interpreted by the MME 604 as an indication that the WTRU 602 supports both PSM and eDRX features, and the MME 604 may make a decision to select one or more of the power saving mechanisms (e.g. PSM and/or eDRX) to be activated.

The MME 604 may decide on the power saving mechanism(s) for the WTRU 602 based on, but not limited to, any of the following information: whether the network supports PSM or eDRX; the user subscription data may contain an indication of which power saving mechanism may be preferred for WTRU 602; the MME 604 may have a local policy or configuration that indicates which power saving mechanism may be preferred; and/or the MME 604 may have the WTRU's 602 traffic pattern information, either by local statistics or inputs from SCEF (not shown), so that the MME 604 may use the pattern information to derive the most appropriate power saving mechanism.

In an example, if MME 604 decides that WTRU 602 should use PSM for power saving, the MME 604 may return a confirmed Active Time value (T3324) in the Attach Accept or TAU Accept message 616 and may not include a confirmed DRX value in the TAU Accept message 616. By way of the TAU Accept message 616, the WTRU 602 is notified that PSM has been selected as the power saving mechanism.

In another the example, if MME 604 decides that the WTRU 602 should use eDRX for power saving, the MME 604 may return a confirmed DRX value in the Attach Accept or TAU Accept message 616 and may not include a confirmed Active Time value (T3324) in the TAU Accept message 616. By way of the TAU Accept message 616, the WTRU 602 may be notified that eDRX has been selected as the power saving mechanism. In another example, the Accept message 616 may include both an Active Time value and DRX value to indicate selection of both PSM and eDRX as power saving mechanisms.

The MME 604 may include a validity timer value, associated with the confirmed Active Time and/or DRX value, in the Attach Accept or TAU Accept message 616. The validity timer value may indicate for how long the selected power saving mechanism(s) is valid before a renegotiation is needed. Upon receiving a validity timer value associated with a selected power saving mechanism, at 618, the WTRU 602 may activate the selected power saving mechanism (e.g. PSM and/or eDRX) and may start the validity timer. At 620, upon the expiry of the validity timer, the WTRU 602 may initiate a renegotiation procedure by sending an (Attach or TAU) request message 622 (or wait until the next Attach or TAU procedure is triggered).

Figure 7:
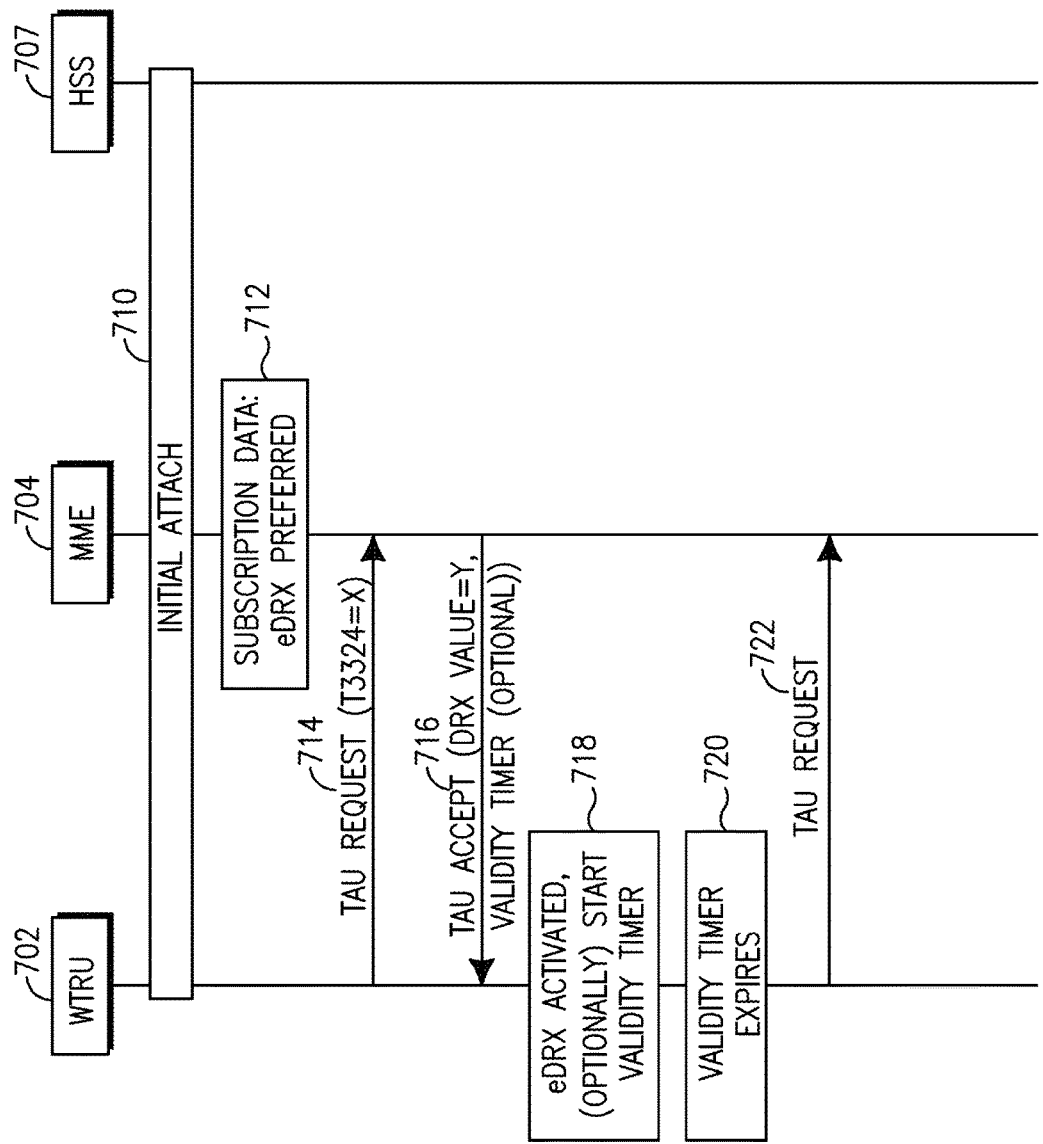
FIG. 7 shows a flow diagram of another example power saving mechanism selection procedure.

FIG. 7 shows a flow diagram of another example power saving mechanism selection procedure 700. As in FIG. 6, an initial attachment procedure 610 may occur between the WTRU 702, the MME 704 and the HSS 707 to attach the WTRU 702 to the NW. At 712, the MME 704 may update its subscription data, for example to indicate that eDRX is a preferred power saving mechanism. In example power saving mechanism selection procedure 700, if WTRU 702 supports PSM and eDRX and neither mechanism has been activated, the WTRU 702 may indicate a preference for a mechanism by including the mechanism specific parameter in the Attach Request or TAU Request message 714. For example, if WTRU 702 prefers to use PSM, the WTRU 702 may include an Active Time value (T3324) in the TAU request message 714. If WTRU 702 prefers to use eDRX, the WTRU 702 may include a DRX value in the TAU request message 714.

If the NW (i.e. MME 704) agrees to the WTRU's 702 preferred power saving mechanism, the MME 704 may confirm the WTRU's 702 choice by including the corresponding PSM parameter in the Attach Accept or TAU Accept message 716 (the value of the parameter may be the same as or different from the WTRU 702 suggested value). If the NW doesn't agree to the WTRU's 702 preference, the MME 704 may indicate to the WTRU 702 to use another mechanism by including the parameter of another kind of power saving mechanism in the Attach Accept or TAU Accept message(s) 716. For example, the WTRU 702 may include a T3342 Active Time value in the TAU Request message 714, indicating it intends to use PSM for power saving. However, the NW may judge that it is better to use eDRX, so the MME 704 may respond with a DRX value in the TAU Accept message 716. Upon receiving the TAU Accept message 716, the WTRU 702 at 718 may activate eDRX (instead of PSM) for power saving and may start a validity timer, of provided.

The MME 704 may include a validity timer value associated with the Active Time or DRX value in the Attach Accept or TAU Accept message 716. The validity timer may indicate how long the selected mechanism may remain valid before a renegotiation is needed. Upon receiving a timer associated with the selected mechanism, the WTRU 702 may start the timer and upon the expiry of the timer at 720, the WTRU 702 may initiate the negotiation procedure again by sending a TAU request message 722 (or the WTRU 702 may wait until the next Attach or TAU is triggered).

Figure 8:
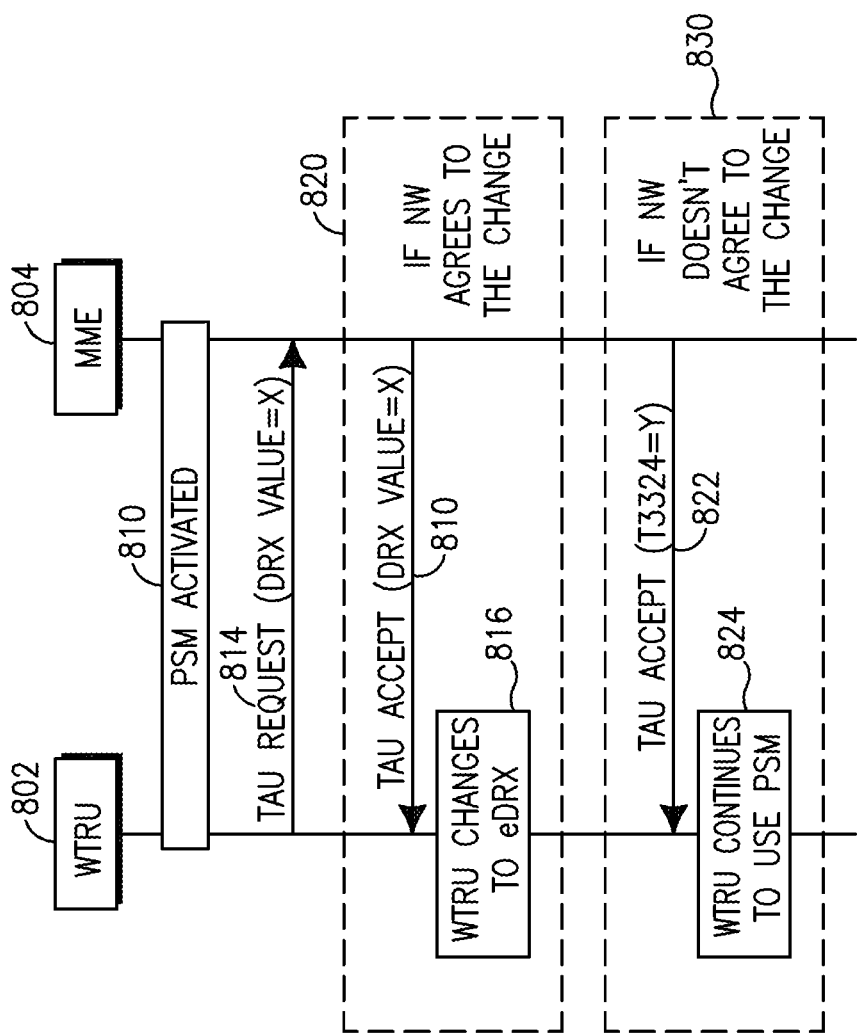
FIG. 8 shows a flow diagram of an example power saving mechanism changing procedure.

Procedures for alternating or changing power saving mechanisms in a WTRU are described herein. FIG. 8 shows a flow diagram of an example power saving mechanism changing procedure 800. At 810, if one kind of power saving mechanism, for example PSM and/or eDRX, has been activated in a WTRU 802, the WTRU 802 may initiate and send a TAU request message 814 to change to another kind of power saving mechanism by including a specific parameter of the target powering saving mechanism in the TAU Request message 814 or other appropriate NAS messages (e.g. Extended Service Request message). Examples of triggers for WTRU 802 to initiate sending the TAU request message 814 with the request to change power saving mechanism may include, but is not limited to include, any of the following triggers: the remaining batter power at the WTRU 802 has dropped (or increased) to a certain level that requires a more efficient power saving mechanism; there has been a long period of data inactivity that may benefit from a more efficient power saving mechanism; the WTRU 802 may have a different traffic pattern at different hours of the day such that the WTRU 802 may benefit from a more efficient power saving mechanism according to the traffic pattern; and/or the validity timer that's associated with the current power saving mechanism has expired.

In an example, upon receiving the TAU request message 814, at 820, the MME 804 may confirm the change in power saving mechanism by including the corresponding parameter (the value of the parameter may be the same or different as the WTRU suggested value) of the target power saving mechanism in the response message, which may be a TAU Accept message 810. Accordingly, at 816, the WTRU 802 may change its power saving mechanism (e.g. from PSM to eDRX).

In another example, upon receiving the TAU request message 814, at 830, the MME 804 may reject the change request by not including the same parameter in the response (TAU accept message 822) or including the parameter of the currently activated power saving mechanism in the TAU accept message 822. In this case, at 824, the WTRU 802 may continue to use the currently activated power saving mechanism (e.g. PSM).

For example, if PSM is currently activated in a WTRU 802, the WTRU 802 may include an eDRX value in the TAU Request message 814 when the TAU procedure is triggered, thus indicating that the WTRU 802 hopes to change the power saving mechanism from PSM to eDRX. If the NW agrees to the change, the MME 804 may include the same DRX parameter in the TAU Accept message 810. If a confirmation is received by the WTRU 802, it may alternate the power saving mechanism to the newly assigned power saving mechanism, otherwise, the WTRU 802 may maintain activated the current power saving mechanism.

Figure 9:
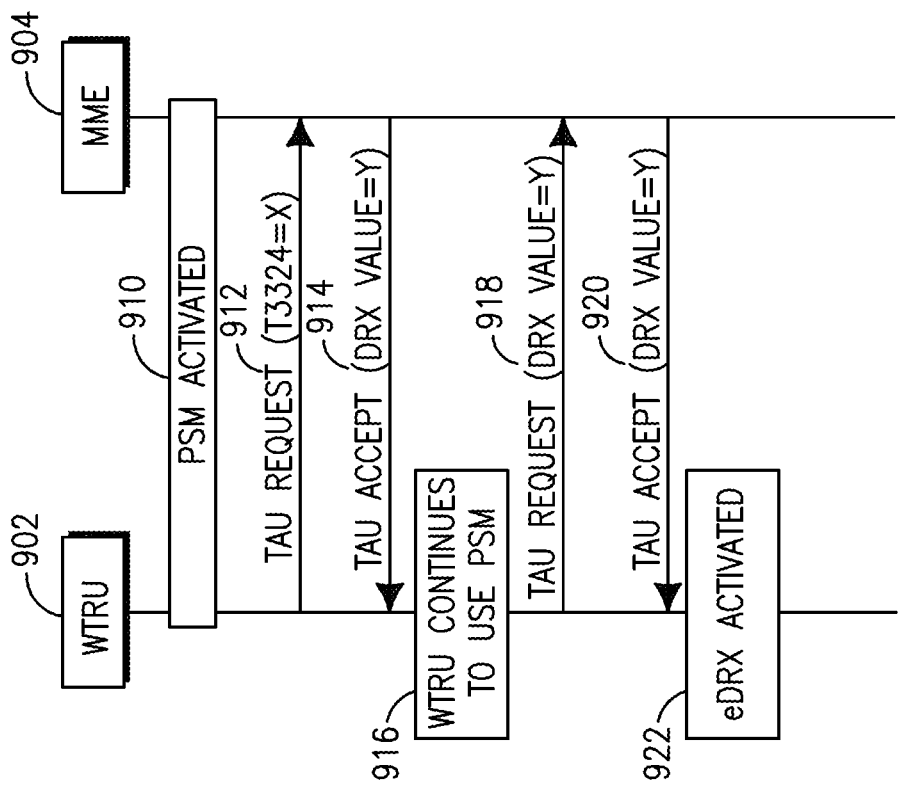
FIG. 9 shows a flow diagram of another example power saving mechanism changing procedure.

FIG. 9 shows a flow diagram of another example power saving mechanism changing procedure 900. In the example power saving mechanism changing procedure 900, it is assumed that a power saving mechanism(s) (e.g. PSM) is activated, at 910. When the MME 904 (NW) receives a TAU Request message 912 that may contain the specific parameter of the currently activated power saving mode (e.g. PSM Active Time, T3324=X), the MME 904 may respond by sending a TAU accept message 914 without including the same parameter for the activated power saving mechanism and/or with including an indication that another power saving mechanism should be used. For example, the MME 904 may include a suggestive parameter value (e.g. parameter DRX value=Y) for the target mechanism (e.g. eDRX) as the indication.

Upon receiving the indication, the WTRU 902 may initiate the negotiation for the new power saving mechanism when the next TAU procedure is triggered. If a suggestive parameter was given by the MME 904, the WTRU 902 may include the same power saving mechanism parameter value in the next TAU Request message 918, and the MME 904 may respond with a corresponding parameter value in the TAU Accept response message 920. At 916, The WTRU may continue to use the existing power saving mechanism (e.g. PSM). At 922, following the TAU procedure, the WTRU 902, may activate the new power saving mechanism as indicated by the MME 904 (e.g. eDRX).

In an example, if a WTRU's current power saving mechanism is PSM, it may include the Active Time in every TAU Request message. If at a point of time the NW wants to change the WTRU's power saving mechanism to eDRX, the MME may respond without confirming the Active Time but instead may include a suggestive eDRX value, which may indicate to the WTRU that it should change the power saving mechanism to eDRX. When the next TAU procedure is triggered, the WTRU may include an eDRX value in the TAU Request message to start the negotiation of the new eDRX mechanism, which may or may not be the same as the suggested value from the NW.

Examples of reasons for the NW to change the WTRU's power saving mechanism include, but are not limited, any of the following reasons: the WTRU subscription data may indicate that different power saving mechanisms are preferred for a different time of a day; the NW may detect a WTRU activity pattern or have input of the traffic pattern from SCEF or Application Servers that require more efficient power saving mechanisms; and/or the serving MME changes due to mobility or redirection to the dedicated CN, and the new serving MME does not support the current power saving mechanism.

Example procedures for reporting WTRU reachability as part of connection property are described herein. In an example, a WTRU's reachability or latency characteristics, which may be changed by activation/deactivation of the power saving mechanism (e.g. PSM, eDRX and/or other), may be associated to one of the WTRU's PDN(s) and may be considered part of the PDN's connection property. The WTRU's reachability or latency characteristics information may be sent to and/or stored at the policy and charging enforcement function (PCEF) and/or the PCRF so that the AS/SCS may use the APIs provided by the SCEF to retrieve this WTRU's reachability or latency characteristics information when needed.

Figure 10:
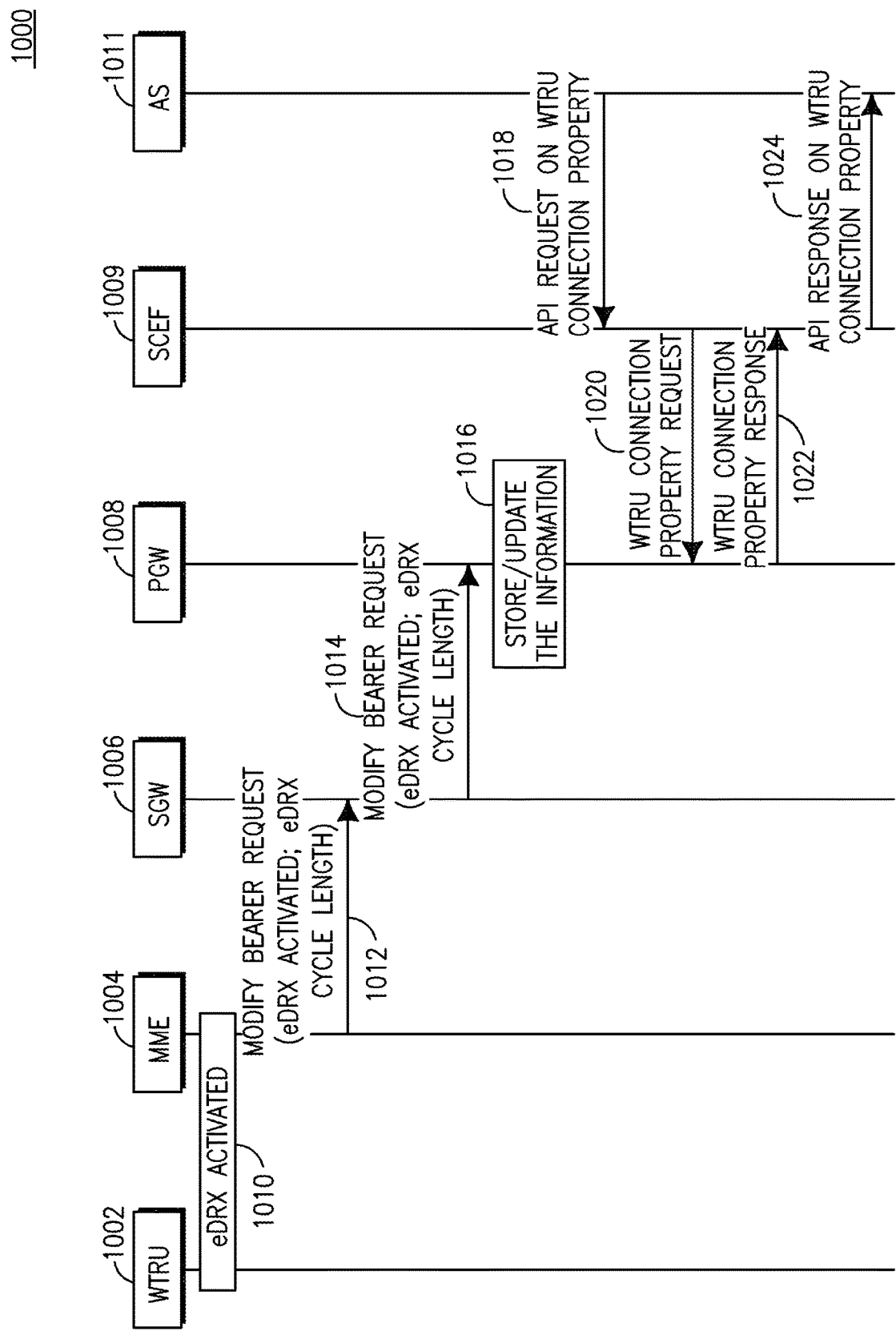
FIG. 10 shows a flow diagram of an example WTRU reachability reporting procedure.

FIG. 10 shows a flow diagram of an example WTRU reachability reporting procedure 1000. At 1010, The WTRU 1002 and the MME 1004 may have negotiated to activate a power saving mechanism (e.g. eDRX) in the WTRU 1002. When a power saving mechanism (e.g. PSM and/or eDRX) is activated or deactivated in WTRU 1002, or the related parameters (e.g. PSM Active Time and/or eDRX cycle length) change, the MME 1004 may initiate an appropriate GTP-C procedure, such as a Modify Bearer Request procedure, to send the power saving mechanism information over S11 and S5/S8 interface to the PGW 1008. For example, the modify bearer request procedure may include modify bearer request message 1012 from the MME 1004 to the SGW 1006, and modify bearer request message 1014 from the SGW 1006 to the PGW 1008.

The GTP-C message information (e.g. in the Modify Bearer Request messages 1012 and/or 1014) may include, but is not limited to include, any of the following information: whether the PSM is activated or deactivated; if the PSM is activated, the value of the Active Time; whether the eDRX is activated or deactivated; if the eDRX is activated, the value of the eDRX cycle; parameters for any other power saving mechanism that may be supported by the WTRU 1002; estimated time of the next paging opportunity that the MME 1004 may acquire from the eNB (not shown); latency Indication, such as whether there may be a risk of great latency for reaching the WTRU 1002; and/or reachability indication, such as whether there may be a risk of unreachability of the WTRU 1002.

The MME 1004 may send the information concerning power saving mechanisms at the WTRU 1002 in the Modify Bearer Request message 1014, for example using indication flags or as part of modified bearer contexts. After receiving this information concerning power saving mechanisms at the WTRU 1002 from the MME 1004 (e.g. via the SGW 1006), the PGW 1008 may locally store/update the information, 1016. If a PCRF is present (not shown), the PGW 1008 may forward the information to the PCRF.

With the information concerning power saving mechanisms at the WTRU 1002 stored at the PGW 1008 (and/or PCRF), the PGW 1008 may provide the information to the AS/SCS 1011 as part of the WTRU's connection properties via the SCEF 1009. For example, the AS 1011 may send an API request message 1018 to request WTRU connection property information to the SCEF 1009, and the SCEF 1009 may in turn send the WTRU connection property request message 1020 to the PGW 1008. The PGW 1008 may respond to the SCEF 1009 with a WTRU connection property response message 1022, including the information concerning power saving mechanisms at the WTRU 1002, and the SCEF 1009 may in turn send an API response message 1024 with the WTRU connection property information to the AS 1011.

Figure 11:
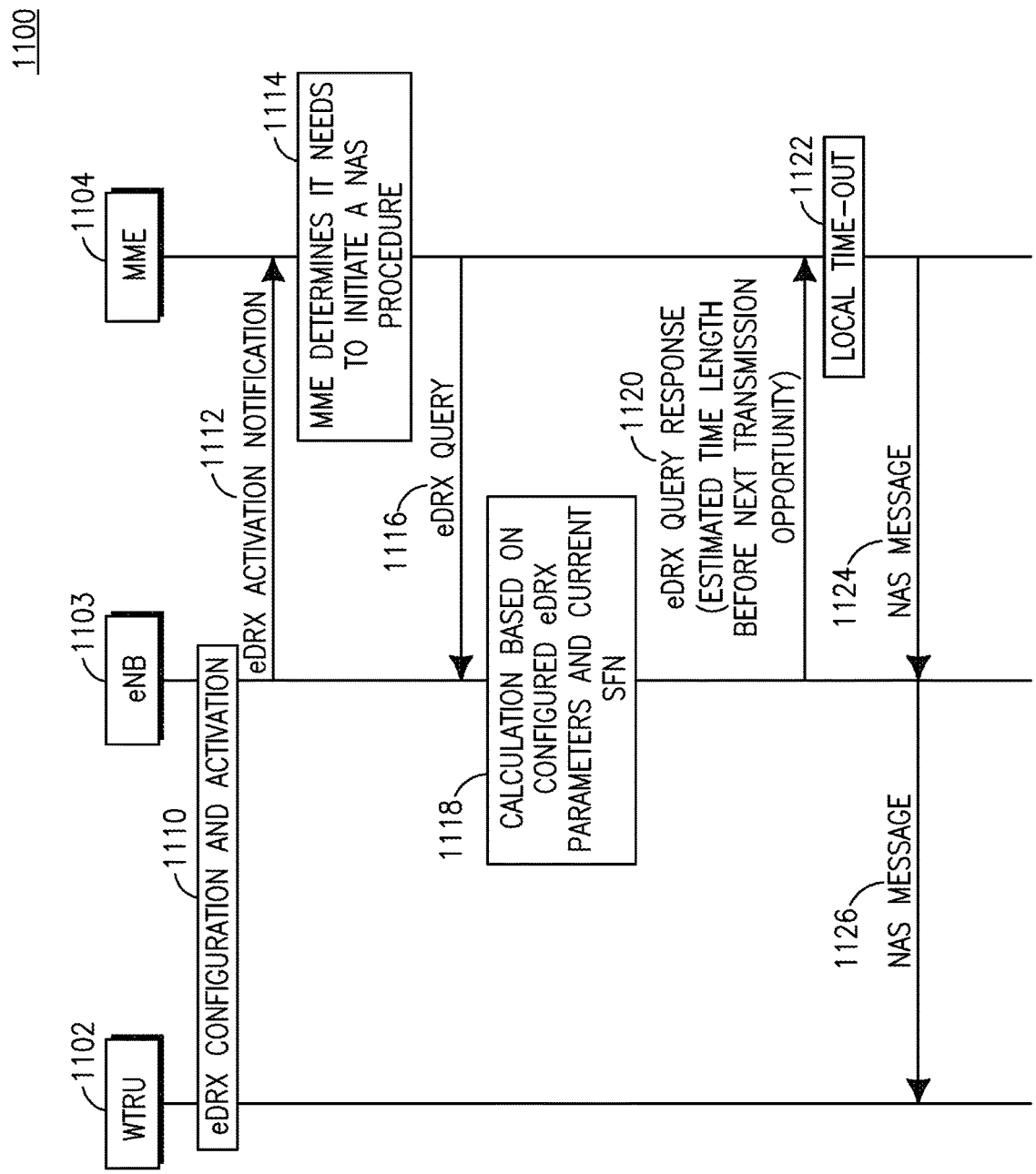
FIG. 11 shows a flow diagram of an example mobility management entity (MME) and evolved Node B (eNB) communication procedure.

Example procedures for MME and eNB communication for transmission opportunity may help avoid NAS procedure timeout at the network side, for example when the WTRU is activated with eDRX in Connected mode as described above. FIG. 11 shows a flow diagram of an example MME and eNB communication procedure 1100 for transmission opportunity. When eNB 1103 activates/deactivates the WTRU 1102 for eDRX, 1110, the MME 1103 may be aware of the WTRU's 1102 DRX status in Connected mode. For example, the eNB 1103 may send an eDRX activation notification message 1112 to the MME 1104, and the MME 1104 may determine that it should initiate a NAS procedure at 1114.

In an example, when the MME 1104 needs to initiate a NAS procedure and the WTRU 1102 is activated with eDRX, the MME 1104 may send a S1AP eDRX Query message 1116 to the eNB 1103 in order to query for an estimation of the time period before the next downlink (DL) transmission opportunity is available. Upon receiving the query message 1116, the eNB 1103 may calculate the time length until the next On_Duration, based on the eDRX parameters it has configured for the WTRU 1102 and the current system frame number (SFN), at 1118. The eNB 1103 may return the estimated time length to the MME in 1104 via an S1AP eDRX Query Response message 1120. A high degree of accuracy may not be needed for the estimated time length in order for the MME 1104 to make appropriate decisions (for example, the estimated time length may be in seconds).

Depending on the received estimated time before the next DL transmission opportunity, the MME 1122 may make different example decisions, including, for example: if the estimated time is not long (e.g., approximately 2 s) compared to the NAS timer value, the MME 1104 may immediately start the NAS procedure; if the estimated time is long (e.g. approximately 10 seconds) compared to the NAS timer, the MME 1104 may apply a local time-out (e.g. approximately 9 seconds) at 1122 and then start the NAS procedure after the time-out 1122. The NAS procedure may include NAS message 1124 from MME 1104 to eNB 1103 and NAS message 1126 from eNB 1103 to WTRU 1102.

In an example, when the eNB 1103 returns the estimation of the time length before the next transmission opportunity, the eNB 1103 may also include the configured eDRX cycle value, so that the MME 1104 may roughly calculate the future transmission opportunities for the NAS procedures. If the eNB 1103 received the eDRX Query message 1120 from the MME 1104 and has returned an estimated time length that is long compared to the NAS timer, and then the WTRU 1102 initiates UL transmission and becomes active, the eNB 1103 may inform the MME 1104 that the WTRU 1102 has become active and may give an estimation of time duration that the WTRU 1102 will remain active so the MME 1103 can start the pending NAS procedure immediately.

In another example, when the eNB 1103 activates the eDRX at 1110 for the WTRU 1102 and informs the MME 1103 via the eDRX activation notification message 1112, the eNB 1103 may give the MME 1104 an estimation of the time length before next On_Duration, and/or the configured eDRX cycle, so the MME 1104 can have a rough calculation of when the transmission opportunities will happen. This may eliminate the need to query the eNB 1103 before the MME 1104 initiates the NAS procedure.

Example procedures for Mobile Terminated Call Request from the CS Domain are described herein. In an example, upon receiving the Paging message from the CS domain, the MME, being aware of the fact that this particular Connected Mode WTRU has entered eDRX cycle, may not send the Service Request message to the MSC/VLR. Instead, the MME may treat the reception of this Paging message as if the WTRU was in Idle mode. In this case, the MME may wait for the reception of the ESR message from the WTRU before it sends the Service Request message to the MSC/VLR.

In another example, the MME may send the Service Request message to the MSC/VLR. However, the MME may then override the eDRX cycle and send the CS Service Notification message to the eNB, with an indication that the WTRU should leave sleep mode. The eNB may then use the Physical Downlink Control Channel (PDCCH) in order to notify the WTRU to leave sleep mode and decode the NAS message. In another example, the eNode B may send a notification to the WTRU that there is a NAS message waiting for it that needs to be read before the sleep mode cycle elapses.

Example procedures for reliable Paging for SI change notification in WTRUs using eDRX are described herein. In an example, a WTRU may receive an indication from the network (e.g. MME) that it needs to read system information block 1 (SIB1) systemInfoValueTag at each wakeup when eDRX is used. Such an indication may be sent to the WTRU by the network during the same NAS procedure (e.g. Attach or TAU procedure) for the eDRX cycle negotiation.

If an indication to read SIB1 systemInfoValueTag at each wakeup is received, the WTRU may read SIB1 systemInfoValueTag first each time it wakes up and may determine if there is any SIB that has changed and needs reacquisition. In an example, the WTRU may need to wake up before the scheduled PF or PO considering that reading SIB1 (along with other possible SIB update reacquisition) may take some time. In an embodiment, the WTRU may determine, by reading the systemInfoValueTag in SIB1, that the changed SIB(s) is not critical, and the WTRU may defer the changed SI reacquisition after it has finished Paging monitoring.

In an example, if the WTRU determines that there is a SI change by reading SIB1 systemInfoValueTag and has reread changed SIB(s), the WTRU may ignore a Paging with SI change notification it receives shortly after before it goes back to sleep. The WTRU may consider this Paging for the same SI change. In another example, the need to read SIB1 may be statically defined in the WTRU based on some specific rules derived from system information or configuration (e.g. all WTRUs that are configured with an eDRX period larger than a specific threshold may need to read SIB1 systemInfoValueTag each wakeup).

In another example, the WTRU may send a network broadcasted BCCH Modification Period to the network (e.g. MME) to help the network decide whether it should configure the WTRU to read SIB1 at each wakeup. The BCCH Modification Period may be sent to the network during the same NAS procedure (e.g. Attach or TAU procedure) used for eDRX cycle negotiation. The MME may make a decision based on the comparison between the BCCH Modification Period length and eDRX cycle length. For example, if the BCCH modification period is 20.48 seconds and the WTRU's eDRX cycle is 10.24 seconds, then there may not be a need to configure the WTRU to read SIB1 at each wakeup. If the BCCH modification period is 10.24 seconds and the WTRU's eDRX cycle is 20.48 seconds, then the WTRU may be configured to read SIB1 at each wakeup.

Figure 12:
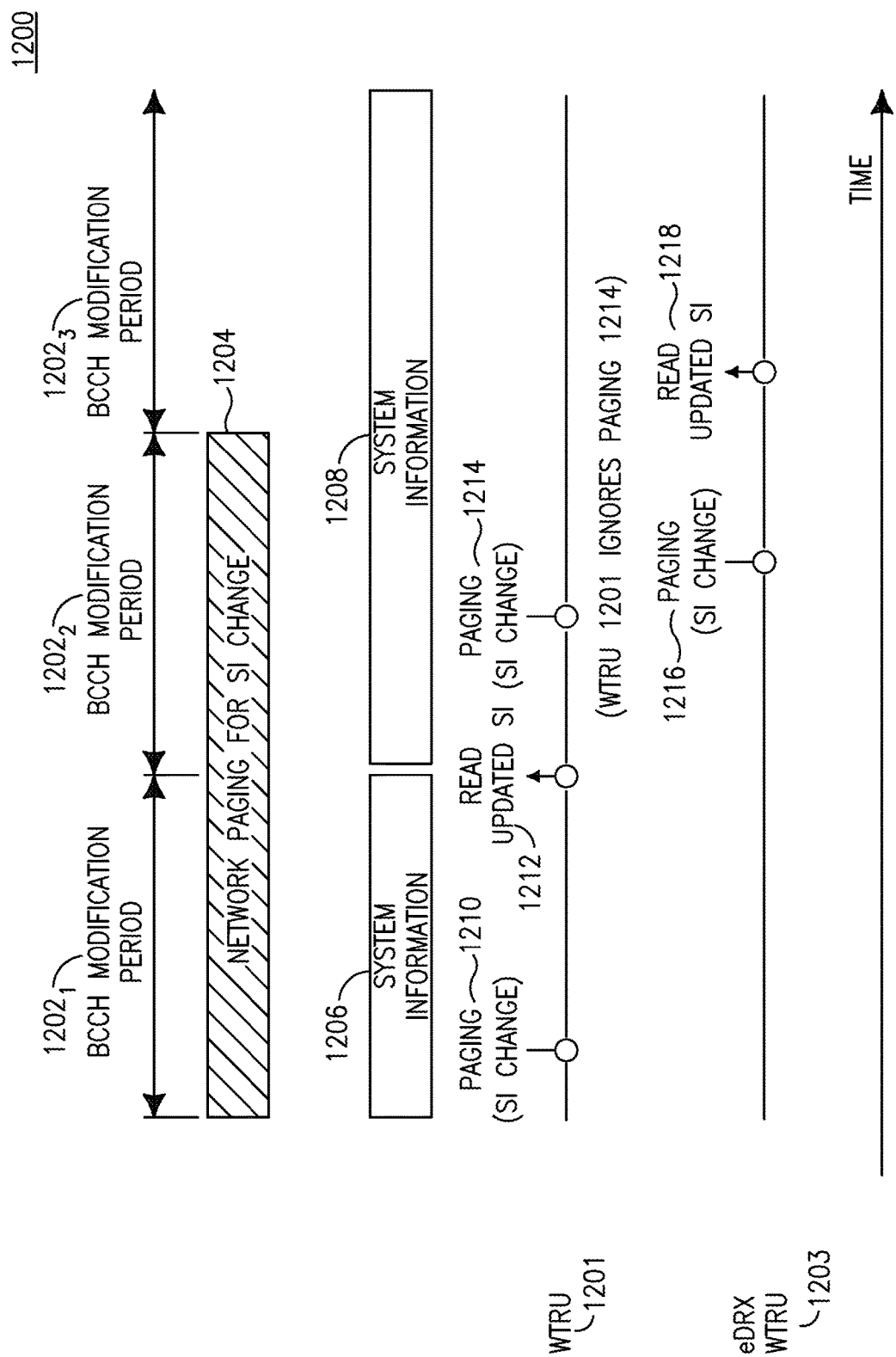
FIG. 12 shows a signaling diagram of an example paging for system information (SI) change notification procedure.

FIG. 12 shows a signaling diagram of an example paging for SI change notification procedure 1200. The example paging for SI change notification procedure 1200 may include extending the network paging for SI time period 1204 to span over multiple BCCH modification periods, for example over BCCH modification periods 1202$_1$ and 1202$_2$. In an example, an eNB (not shown) that supports an eDRX cycle may extend the Paging for SI change notification time period 1204 to cover multiple BCCH Modification Periods 1202$_1$ and 1202$_2$. This may increase the chance of the eDRX WTRU 1203 receiving a Paging (e.g. Paging 1216) and read the updated SI 1218 when the eDRX WTRU 1203 is using an eDRX cycle.

In an example, the BCCH modification periods 1202$_1$, 1202$_2$ and 1202$_3$ may not be changed. The eNB may transmit paging signals 1210, 1214 and 1216, over consecutive modification periods 1202$_1$ and 1202$_2$ instead of just during one modification period 1202$_1$. A real SI change may occur after the first modification period 1202$_1$. In this example, a WTRU 1201 using a default DRX cycle (i.e. a normal or non-eDRX WTRU) may receive multiple paging signals 1210 and 1214 for SI change notification. The WTRU 1201 may read the updated SI 1212 after the first paging signal 1210 and may ignore the repeated paging signal, such as paging signal 1214, for example for those paging signals that are received in no longer than X modification periods (e.g. X=1 or 2 modification periods) after the first paging signal 1210, for example.

In an example, the number of modification periods for which a normal WTRU should ignore the Paging may be configured through dedicated or broadcast signaling. In another example, the number of modification periods for which a normal WTRU should ignore the Paging may be computed by the WTRU itself using the information related to the eDRX cycle or a combination of this information and other information sent in dedicated or broadcast signaling.

For example, if the BCCH modification period is 10.24 seconds and the eDRX cycle is 40.96 seconds, the normal WTRUs may ignore all paging messages received over 4

(eDRX/BCCH Modification) BCCH modification periods, or over a multiple M of eDRX/BCCH Modification. The multiple M may be sent via dedicated or broadcast signaling or may be statically configured in the WTRU. For an eDRX WTRU using an eDRX cycle, if a Paging for SI change notification is received, the eDRX WTRU may read the SI update at the next modification period boundary.

Figure 13:
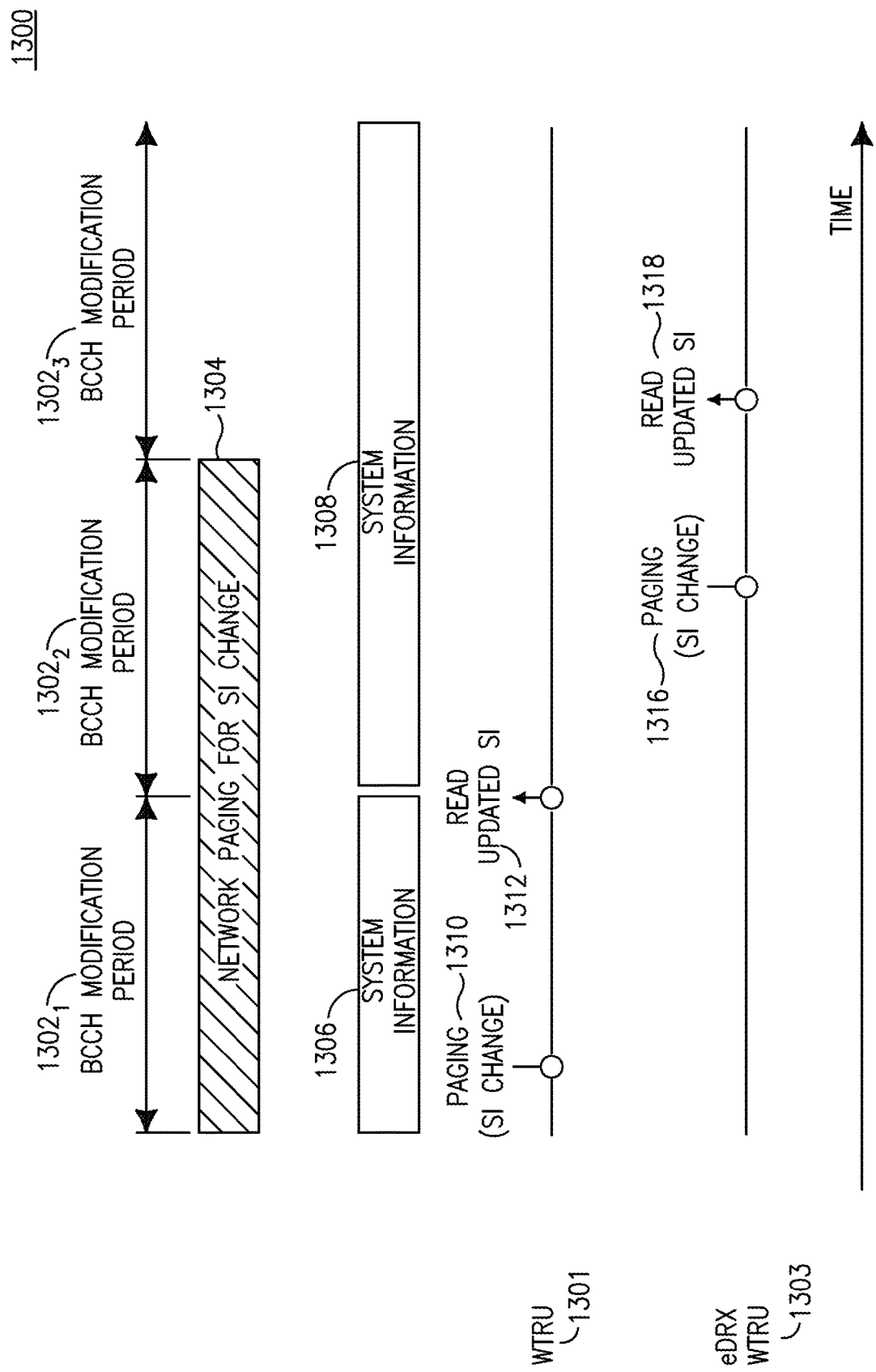
FIG. 13 shows a signaling diagram of another example paging for SI change notification procedure.

FIG. 13 shows a signaling diagram of another example paging for SI change notification procedure 1300. The example paging for SI change notification procedure 1300 is mostly similar to the example paging for SI change notification procedure 1200 in FIG. 12, such that the time of paging for SI change notification 1304 is extended to cover multiple BCCH modification periods $1302_1$ and $1302_2$. In contrast to FIG. 12, the eNB will only page eDRX WTRU 1303 using eDRX during the extended time for SI change notification (e.g. during BCCH modification period $1302_2$). The WTRU 1303 using eDRX may receive a paging signal 1316 for SI change and read the updated SI 1318, where the SI change may include an indicator or flag that may indicate the paging signal 1316 is intended for eDRX WTRUs. A normal WTRU 1301 may receive and ignore the paging signal 1316, for example because the flag in the paging signal 1316 indicates that the paging signal 1316 is for eDRX WTRUs and not normal WTRUs.

In an example, the network may page WTRUs using eDRX during paging occasions that are different than those used to page normal WTRUs, and not send the paging message to normal WTRUs during the extended time for SI change notification. For example, with reference to FIG. 13, the normal WTRU 1301 may be paged only during the original (unchanged) BCCH modification period $1302_1$. Thus, the normal WTRU 1301 may not receive the second paging signal 1316 in BCCH Modification Period $1302_2$.

In an example, when the BCCH modification period is not changed for WTRUs using eDRX, specific system information that should affect the behavior of the WTRUs even while they are asleep may change without a way for the eDRX WTRU to find out about it. An example of such system information is the default DRX parameters used to define the PF and/or PO, which may also be needed by the WTRUs using eDRX.

Figure 14:
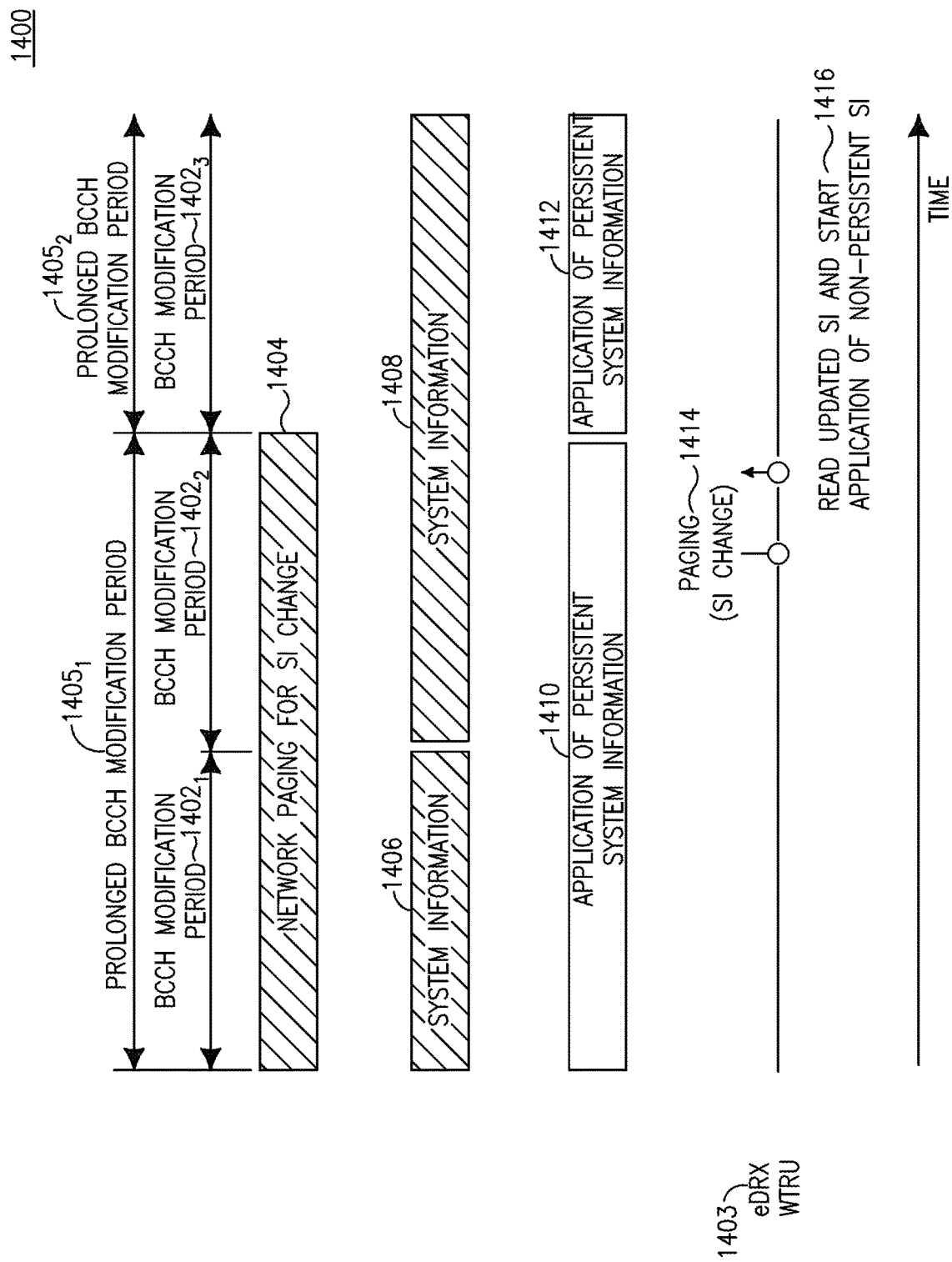
FIG. 14 shows a signaling diagram of an example SI change procedure.

FIG. 14 shows a signaling diagram of an example SI change procedure 1400. In an embodiment, the time instant in which certain system information change takes effect for the WTRUs using eDRX (e.g. WTRU 1403) may be different from that of normal WTRUs (not shown). The normal WTRUs may continue to follow the current rules related to BCCH modification period $1402_1$. The WTRUs 1403 using eDRX may be paged for an extended period of time 1404, as described above (e.g. for a prolonged BCCH modification Period $1405_1$ that may be equal to two BCCH modification periods $1402_1$ and $1402_2$). The eDRX WTRU(s) 1403 may operate under the assumption that certain parts of their system information (e.g. persistent system information) may change according to a prolonged BCCH Modification period $1405_1$ (and prolonged BCCH Modification period $1405_2$ etc.), while other parts of their system information may change according to the old BCCH Modification Period(s) $1402_1$, and therefore may or may not have changed when the eDRX WTRU 1403 receives the paging message 1414.

In an example, in order for a change in the persistent system information according to the prolonged BCCH modification period $1405_1$ to not affect the eDRX WTRU(s) 1403 when they are not able to receive the paging message prior to the time in which the new system information takes effect, the network may continue to assume the old value of this system information for eDRX WTRUs 1403 until the end of a prolonged BCCH modification period $1405_1$. For normal WTRUs, all system information may continue to change according to the original BCCH modification periods $1402_1$ $1402_2$ etc. Example behavior of a WTRU using eDRX is described in further detail below.

Upon reception of a paging message where the SystemInfoModification flag indicates a change in system information, the eDRX WTRU may determine which changes according to the normal BCCH modification period have already taken effect. This determination may be made, for example, according to any of the following techniques: by reading a flag in the paging message; by reading the current value tag in SIB1; and/or by reading a flag or field in one of the SIBs.

The eDRX WTRU may read and update all system information. For system information associated with the prolonged BCCH modification period (e.g. prolonged BCCH modification period $1405_1$), the WTRU may assume that this system information change will take effect at the beginning of the next prolonged BCCH modification period (e.g. prolonged BCCH modification period $1405_2$). For all system information associated with the normal BCCH modification period the following rules may apply: based on the above determination, if the change in this system information has already taken effect, the eDRX WTRU may immediately use the new system information; and/or based on the above determination, if the change in this system information has yet to take effect, the WTRU may use the new system information as of the start of the next regular BCCH modification period.

In an example, some or all of the new system information (for example some system information that changes according to the original BCCH modification period) may be sent to the eDRX WTRU directly in the paging message itself. This may avoid the need for the WTRU to read all system information. Furthermore, the sending of system information in the paging message itself may occur when the above determination indicates that the change of system information has already taken effect. In another example, the eDRX WTRU may always receive its new system information in the paging message.

In an example, the parameters related to PF and PO calculation in SIB2, which may be used by normal WTRUs, may be used for calculation of the wakeup times and window for WTRUs using eDRX. For example, these parameters may be part of the system information that may change according to the prolonged BCCH modification period for the WTRUs using eDRX only. In this case, the network may continue to assume that the WTRUs using eDRX use the old system information until the beginning of the next prolonged BCCH modification period. At the beginning of the next prolonged BCCH modification period after the network starts to send new contents of SIB2 (i.e., the system information in FIGS. 12-14 changes from old to new), an eDRX WTRU that received the paging may modify the calculation of its wakeup instances based on the new system information.

In an example, the prolonged BCCH modification period may be configured in system information by setting it to be a multiple of the eDRX period. The multiple may be provided in system information, or it may be configured as a multiple of the default DRX period using an extended range of modificationPeriodCoeff, for example. In another example, the prolonged BCCH modification period may be statically configured in the WTRU by dedicated signaling, or configured as part of the Attach or TAU procedure. In another example, the prolonged BCCH modification period may be defined specifically and uniquely for each WTRU and may not be specifically fixed time intervals like BCCH modification periods.

For example, the end of the BCCH modification period may be defined by the end of the wakeup window for the eDRX wakeup period in which a WTRU receives the paging with SystemInfoModification flag set to true. New system information may be sent by the network at time T1 (e.g. corresponding to the change in old system information 1406 and new system information 1408 in FIG. 14). A WTRU using eDRX may have a wakeup scheduled at time T2, where T2>T1. This WTRU may continue to use the old system information to calculate its DRX wakeup parameters until it receives the paging at or after time T2. When the WTRU reads the new SIB2 parameters for DRX, it may start using these new parameters to calculate the next wakeup periods for the current or next eDRX period.

In another example, the paging message sent to the eDRX WTRUs may contain the time instance of the start of the BCCH modification period where the new system information may have been transmitted by the network. If this time instance occurs sometime following the reception of the paging message, the eDRX WTRU may wakeup at the boundary of the BCCH modification period even if the BCCH modification period is not aligned with the eDRX wakeup in order to read the system information. If the time instance has already occurred by the time the paging is received, the WTRU may immediately read the new system information.

Any of the above techniques and mechanisms may be implemented together to increase the reliability for eDRX WTRUs to receive Paging for SI change. For example, for WTRUs that have an eDRX cycle not too much longer than one modification period, the WTRUs may rely on the network's extended Paging time to receive the paging for SI change. The WTRUs that have extremely long eDRX cycle may be configured to read SIB1 at each wakeup.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a transceiver; and
   a processor, wherein:
   the transceiver and the processor are configured to receive at least three sets of parameters associated with power saving, wherein a first set of the parameters is associated with an idle state and wherein the first set of the parameters is associated with a first type of network entity, wherein a second set of the parameters is associated with a connected state, wherein a third set of the parameters is associated with the WTRU not being in a connected state and remaining registered with a network and maintaining a packet data network (PDN) connection and wherein the third set of the parameters is associated with a second type of network entity, and wherein the first type of network entity is different than the second type of network entity; and
   the transceiver and the processor are further configured to, on a condition that the WTRU is not in the connected state and remains registered with the network, enter active times based on the third set of the parameters, wherein the transceiver and the processor are further configured to, during the active times, monitor physical downlink control channels (PDCCHs) for paging messages.

2. The WTRU of claim 1 wherein the transceiver and the processor are further configured in the idle state to monitor PDCCHs for paging messages based on the first set of the parameters.

3. The WTRU of claim 1 wherein the transceiver and the processor are further configured in the connected state, to monitor PDCCHs based on the second set of the parameters.

4. The WTRU of claim 1 wherein the WTRU is in a connected state, and wherein the transceiver and the processor are further configured to receive a message from the network indicating the WTRU to transition from the connected state to a state to utilize the third set of the parameters.

5. The WTRU of claim 1 wherein a timer is associated with the third set of the parameters and on a condition that the timer expires, the processor is configured to transition to the idle state and utilize the second set of the parameters.

6. A method implemented by a wireless transmit/receive unit (WTRU), the method comprising:
   receiving at least three sets of parameters associated with power saving, wherein a first set of the parameters is associated with an idle state and wherein the first set of the parameters is associated with a first type of network entity, wherein a second set of the parameters is associated with a connected state, wherein a third set of the parameters is associated with the WTRU not being in a connected state and remaining registered with a network and maintaining a packet data network (PDN) connection and wherein the third set of the parameters is associated with a second type of network entity, and wherein the first type of network entity is different than the second type of network entity; and
   on a condition that the WTRU is not in the connected state and remains registered with the network, entering active times based on the third set of parameters, and monitoring physical downlink control channels (PDCCHs) for paging messages during the active times.

7. The method of claim 6 further comprising monitoring, in the idle state, PDCCHs for paging messages based on the first set of the parameters.

8. The method of claim 6 further comprising monitoring, in the connected state, PDCCHs based on the second set of the parameters.

9. The method of claim 6 further comprising receiving a message from the network indicating the WTRU to transition from the connected state to a state to utilize the third set of the parameters.

10. The method of claim 6 wherein a timer is associated with the third set of the parameters and on a condition that the timer expires, transitioning to the idle state and utilizing the second set of the parameters.

\* \* \* \* \*